United States Patent
Manandhar et al.

(10) Patent No.: US 11,308,733 B2
(45) Date of Patent: Apr. 19, 2022

(54) GESTURE DETECTION USING ULTRASONIC CLICKS

(71) Applicant: Bose Corporation, Framingham, MA (US)

(72) Inventors: Prakash Manandhar, Framingham, MA (US); Ayan Agrawal, Jersey City, NJ (US); Somasundaram Meiyappan, Chennai (IN); Nathan Blagrove, Wayland, MA (US)

(73) Assignee: Bose Corporation, Framingham, MA (US)

( * ) Notice: Subject to any disclaimer, the term of this patent is extended or adjusted under 35 U.S.C. 154(b) by 288 days.

(21) Appl. No.: 16/531,995

(22) Filed: Aug. 5, 2019

(65) Prior Publication Data

US 2021/0042511 A1 Feb. 11, 2021

(51) Int. Cl.
 *G06V 40/20* (2022.01)
 *G06F 3/043* (2006.01)
 *G06F 3/01* (2006.01)

(52) U.S. Cl.
 CPC .............. *G06V 40/28* (2022.01); *G06F 3/017* (2013.01); *G06F 3/043* (2013.01)

(58) Field of Classification Search
 CPC .. G06K 9/00355; G06K 9/6267; G06F 3/043; G06F 3/017; G06F 3/011; H04R 1/1008; H04R 1/1041; G06V 40/28
 See application file for complete search history.

(56) References Cited

U.S. PATENT DOCUMENTS

| | | | | |
|---|---|---|---|---|
| 5,758,173 A | * | 5/1998 | Evoy | G06F 1/1637 713/320 |
| 9,880,273 B2 | * | 1/2018 | Matsuura | G01S 15/04 |
| 9,891,067 B2 | * | 2/2018 | Hong | G01C 21/3608 |
| 10,386,481 B1 | * | 8/2019 | Chen | G06F 3/017 |
| 2004/0083106 A1 | * | 4/2004 | Rines | G10L 13/02 704/E15.041 |
| 2012/0001875 A1 | * | 1/2012 | Li | G01S 7/5273 345/177 |
| 2012/0206339 A1 | * | 8/2012 | Dahl | H04N 21/42204 345/156 |

(Continued)

OTHER PUBLICATIONS

R. Nandakumar et al., "FingerIO: Using Active Sonar for Fine-Grained Finger Tracking", CHI '16, May 7-12, 2016, San Jose, CA.

(Continued)

*Primary Examiner* — Grant Sitta
(74) *Attorney, Agent, or Firm* — Young Basile Hanlon & MacFarlane, P.C.

(57) ABSTRACT

Systems and methods for detecting gestures using ultrasonic clicks are described. For example, some methods include playing an ultrasonic click using an audio driver, wherein the ultrasonic click is a modulated audio pulse with a duration less than one hundred periods of a modulation frequency waveform of the ultrasonic click; accessing a recording, captured using a microphone, of the ultrasonic click; applying an ultrasonic bandpass filter to the recording to obtain a filtered signal; determining a classification of a gesture based on the filtered signal; and transmitting, storing, or displaying an indication of the classification of the gesture.

25 Claims, 10 Drawing Sheets

(56) References Cited

U.S. PATENT DOCUMENTS

| | | | | |
|---|---|---|---|---|
| 2013/0301391 | A1* | 11/2013 | Altman | G01S 15/003 367/100 |
| 2015/0085620 | A1* | 3/2015 | Macours | H03G 7/002 367/199 |
| 2015/0293599 | A1* | 10/2015 | Shih | G06F 3/04847 345/173 |
| 2016/0241961 | A1* | 8/2016 | Josefsson | H03G 5/005 |
| 2016/0300361 | A1* | 10/2016 | Xie | G06N 20/00 |
| 2017/0060254 | A1* | 3/2017 | Molchanov | G06F 3/011 |
| 2017/0142519 | A1* | 5/2017 | Lasseuguette | G10L 19/22 |
| 2017/0168158 | A1* | 6/2017 | Reining | G01S 7/524 |
| 2017/0295466 | A1* | 10/2017 | Strutt | H04W 4/023 |
| 2017/0367681 | A1* | 12/2017 | Wang | A61B 8/04 |
| 2018/0152783 | A1* | 5/2018 | Barmoav | H04R 1/323 |
| 2018/0160235 | A1* | 6/2018 | Lesso | H04R 23/00 |
| 2018/0360420 | A1* | 12/2018 | Vortman | G16H 50/20 |
| 2019/0172455 | A1* | 6/2019 | Park | H04N 21/42222 |
| 2019/0196578 | A1* | 6/2019 | Iodice | G06V 40/107 |
| 2019/0297407 | A1* | 9/2019 | Stanford-Jason | G10L 25/84 |
| 2019/0324551 | A1* | 10/2019 | Parshionikar | G06V 40/19 |
| 2020/0383580 | A1* | 12/2020 | Shouldice | A61B 5/1102 |

OTHER PUBLICATIONS

Y. Yovel et al., "Click-based echolocation in bats: not so primitive after all", J Comp Physiol A, 2011, pp. 515-530, vol. 197.

W. Mao et al., "CAT: High-Precision Acoustic Motion Tracking", MobiCom '16, Oct. 3-7, 2016, New York City, NY.

Chirp Microsystems, Inc., "Chirp|Technology—Chirp Microsystems" [Retrieved Aug. 6, 2019]. Retrieved from the Internet: <www.chirpmicro.com/technology.htm>.

Youtube, transcript from video clip entitled "BBC Miracles of Nature—UltraBike and UltraCane", 17 pages, uploaded on Sep. 11, 2013 by user "Julie Davies" Retrieved from the Internet: <https://www.youtube.com/watch? v=Wn5a89SpDws>.

Youtube, transcript from video clip entitled "Human echolocation—Daniel Kish, 'Batman'", 6 pages, uploaded on Jul. 5, 2013 by user "perceivingacting". Retrieved from the Internet: <https://www.youtube.com/watch?v=A8lztr1tu4o>.

Youtube, transcript from video clip entitled "Professor Tim Leighton, University of Southampton, 'The Acoustic Bubble' at #MDRWeek", 60 pages, uploaded on May 9, 2013 by user "IDRatSotonUniversity". Retrieved from the Internet <https://www.youtube.com/watch?v=5H4toaWU_IY>.

* cited by examiner

GESTURE DETECTION USING ULTRASONIC CLICKS

TECHNICAL FIELD

This disclosure relates to gesture detection using ultrasonic clicks.

BACKGROUND

Gestures are often detected using cameras trained on a gesture area or specialized sensors for tracking the motion of body parts (e.g., hands) of a user that are used to make the gestures.

SUMMARY

Disclosed herein are implementations of gesture detection using ultrasonic clicks.

In a first aspect, the subject matter described in this specification can be embodied in systems that include a microphone; an audio driver; and a processing apparatus configured to: play an ultrasonic click using the audio driver, wherein the ultrasonic click is a modulated audio pulse with a duration less than one hundred periods of a modulation frequency waveform of the ultrasonic click; access a recording, captured using the microphone, of the ultrasonic click; apply an ultrasonic bandpass filter to the recording to obtain a filtered signal; and determine a classification of a gesture based on the filtered signal.

In a second aspect, the subject matter described in this specification can be embodied in methods that include playing an ultrasonic click using an audio driver, wherein the ultrasonic click is a modulated audio pulse with a duration less than one hundred periods of a modulation frequency waveform of the ultrasonic click; accessing a recording, captured using a microphone, of the ultrasonic click; applying an ultrasonic bandpass filter to the recording to obtain a filtered signal; determining a classification of a gesture based on the filtered signal; and transmitting, storing, or displaying an indication of the classification of the gesture.

In a third aspect, the subject matter described in this specification can be embodied in systems that include a microphone; an audio driver; and a processing apparatus configured to: play a first ultrasonic pulse using the audio driver; play a second ultrasonic pulse using the audio driver, wherein the second ultrasonic pulse has an amplitude different from a corresponding amplitude of the first ultrasonic pulse; access a first recording, captured using the microphone, of the first ultrasonic pulse; access a second recording, captured using the microphone, of the second ultrasonic pulse; apply an ultrasonic bandpass filter to the first recording to obtain a first filtered signal; apply the ultrasonic bandpass filter to the second recording to obtain a second filtered signal; and determine a classification of a gesture based on the first filtered signal and the second filtered signal.

In a fourth aspect, the subject matter described in this specification can be embodied in methods that include playing a first ultrasonic pulse using an audio driver; playing a second ultrasonic pulse using the audio driver, wherein the second ultrasonic pulse has an amplitude different from a corresponding amplitude of the first ultrasonic pulse; accessing a first recording, captured using a microphone, of the first ultrasonic pulse; accessing a second recording, captured using the microphone, of the second ultrasonic pulse; applying an ultrasonic bandpass filter to the first recording to obtain a first filtered signal; applying the ultrasonic bandpass filter to the second recording to obtain a second filtered signal; and determining a classification of a gesture based on the first filtered signal and the second filtered signal.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
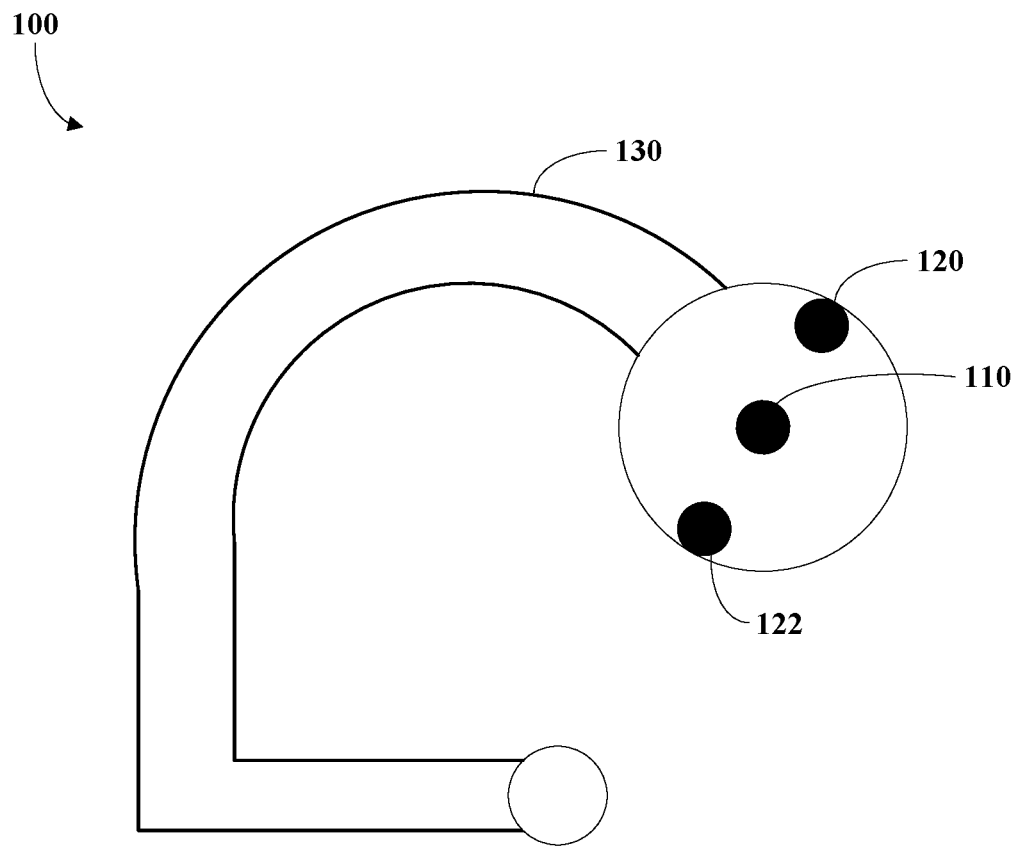
FIG. 1A is an illustration of an example of a wearable device configured to detect gestures using ultrasonic clicks.

Wearable devices are becoming smaller in size, limiting the amount of physical surface available for user interaction such as buttons and capacitive touch. Touch-free gesture based user interfaces are a solution to this problem. However, many touch-free gesture based user interfaces add to the cost, size and power consumption of the device by having to add additional sensors and associated interfacing chips and processing components in the design.

User interfaces disclosed herein can use existing microphones and audio drivers (e.g., a speaker) in a wearable device (see, e.g., FIG. 1) to add ultrasonic clicks of short duration (e.g., on the order of 1 ms) in a frequency band that is inaudible or substantially inaudible (e.g., with frequencies ranging from 18 kHz to 25 kHz) to the output of an audio driver. The reflected waveform is acquired from one or more microphones and processed to detect gestures made by the user near the device.

When the wearable device is worn near a facial feature such as the ear, the system can also be used to aid in user recognition and identification due to the unique signatures in the form of the waveform shape for different earlobe shapes as ultrasonic waves reflect from the wearer's external ear surfaces. Note that although the techniques are primarily described herein in the context of the wearable device being worn on, in, or near a user's ear, the present disclosure is not intended to be so limited. For instance, in other implementations, the wearable device is worn generally on a user's head and/or on a user's neck, to provide some examples. In other words, as can be understood based on this disclosure, the techniques described herein are form factor agnostic, unless explicitly stated otherwise. Microphones placed at different locations within a device can be used to reject signals from far-field objects, and for added robustness while sensing gestures.

Some conventional ultrasonic ranging systems first process the received waveforms to create an estimate of the time-of-flight before performing further recognition operations. In some implementations described herein, a different approach is used to detect and classify gestures and objects that are very close to the device, using use convolutional neural networks to directly recognize gestures that the user performs near the wearable device. Removing the Time-Of-Flight estimation step can provide an advantage in terms of pre-processing requirements.

User interfaces disclosed herein can provide one or more benefits. For example, using existing audio generation, sampling components, and signal processing pipelines for gesture sensing in wearable devices can be advantageous for the following reasons: (1.) Cost of components—component count can be reduced by reusing microphones, speaker drivers and audio-chain electronics and processing, already available in many products, in a way such that they continue to serve their original function. (2.) Size of device—reduction in component count directly can result in simpler mechanical design and potential size reduction. (3.) Power consumption—reusing existing signal processing chain can allow use with fewer chips to be operational at a given time, resulting in lower power consumption and improved battery life. Battery life is a challenging and important characteristic under which consumer wearable devices are evaluated. Using a short "click" ultrasonic signal instead of a continuous wave or longer pulse can also result in lower power consumption as the output amplifier can be turned off for longer periods in a duty cycle. When audio is already playing, there is no additional power requirement for the output stage. (4.) Using clicks for non-time-of-flight based gesture recognition can be more conducive to clutter rejection and higher resolution in the near-field-recent research in the last decade has pointed to certain species of dolphins and bats who use this type of ultrasound for navigating in a very cluttered environment. It has been shown that using multiple clicks of different intensities, the brains of the navigating animals can combine the received data in a non-linear fashion to reject clutter (for example fish and air-bubbles for dolphins). In some implementations, the calculation of Time-Of-Flight can be omitted to use the received waveform data directly for recognition of objects and their speeds and poses. Very near to the active sonar source (e.g., several centimeters from the source) the acoustic field interactions with reflecting and absorbing objects are known to be non-linear and multiple reflections interact with the direct path from output driver to microphones to create complex waveform shapes that can be recognized using a neural network, but it can be difficult to extract time-of-flight data from such waveforms. The system can also be used in dual mode where nearby objects are classified using this method, while the system switches to traditional time-of-flight measurements for farther objects. In some implementations, a calculation can be used to determine whether an object is "near" or "far" in this approach. In air, sound travels at approximately 34 centimeters/millisecond (cm/ms). If the click-width is 1 millisecond (ms), objects that are about 17 centimeters (=34 cm/2 for roundtrip) or nearer will cause waves from the reflected signal to directly interfere with the direct path signals. Using ultrasonic sonar clicks, it is possible to recognize gestures very near to a device which would can infeasible with a time-of-flight based measurement. Near-field reflections can be more conducive to gesture recognition near a wearable device. While there is no sharp threshold above which the signal will be near or far field in this definition, setting a boundary between near-field and far-field at 17 cm or 20 cm is reasonable. Signals can be more conducive to direct time-of-flight estimation techniques as they go from the near to far field regimes.

FIG. 1A is an illustration of an example of a wearable device 100 configured to detect gestures using ultrasonic clicks. The wearable device 100 includes an audio driver 110; a first microphone 120; and a second microphone 122. The wearable device 100 includes a fastening implement 130, attached to the audio driver 110 and the microphones 120 and 122, configured to fasten the audio driver and the microphone to a part of a body of a user when the fastening implement 130 is worn by the user. In this example, the part of the body is an ear and the fastening implement 130 includes a curved arm shaped to fit around a back of the ear, between the ear and a skull of the user. However, in other implementations, the device is configured to generally be worn on a user's head (e.g., glasses or frames, headband, over-ear headphones, on-ear headphones, in-ear headphones, truly wireless in-ear buds, etc.) and/or on a user's neck (e.g., neckband, neckband plus in-ear headphones, etc.). Although not explicitly shown in FIG. 1A, in some implementations, the wearable device 100 also includes a processing apparatus (e.g., the processing apparatus 312), which can be configured to use the audio driver 110 and the microphones 120 and 122 to detect gestures using ultrasonic clicks. For example, the processing apparatus could be configured to play an ultrasonic click using the audio driver 110; access a recording, captured using the microphone 120, of the ultrasonic click; apply an ultrasonic bandpass filter to the recording to obtain a filtered signal; and determine a classification of a gesture based on the filtered signal. The ultrasonic click could be a modulated audio pulse with a duration less than one hundred periods of a modulation frequency waveform of the ultrasonic click.

Figure 1B:
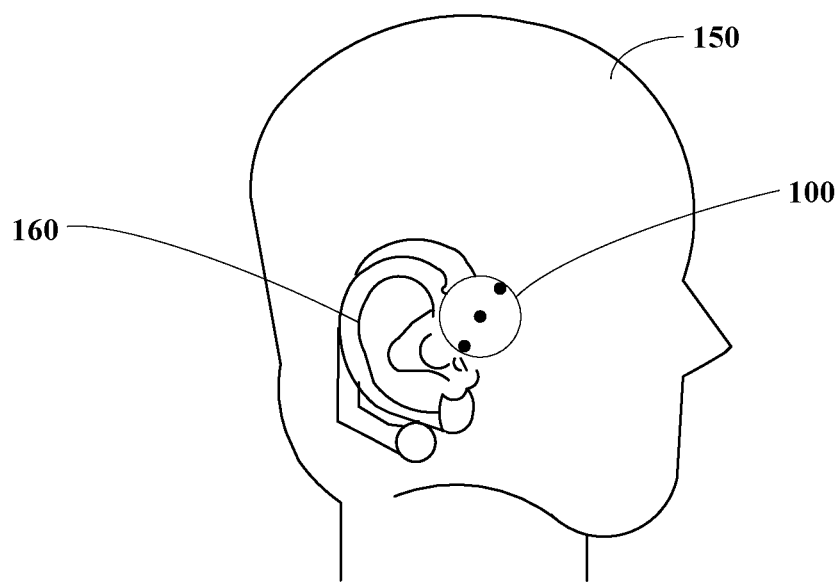
FIG. 1B is an illustration of the example of a wearable device of FIG. 1A worn on an ear of a human.

FIG. 1B is an illustration of the example of the wearable device 100 of FIG. 1A worn on an ear 160 of a human 150. For example, the wearable device 100 could be configured to implement the process 400 of FIG. 4. For example, the wearable device 100 could be configured to implement the process 600 of FIG. 6.

Figure 2:
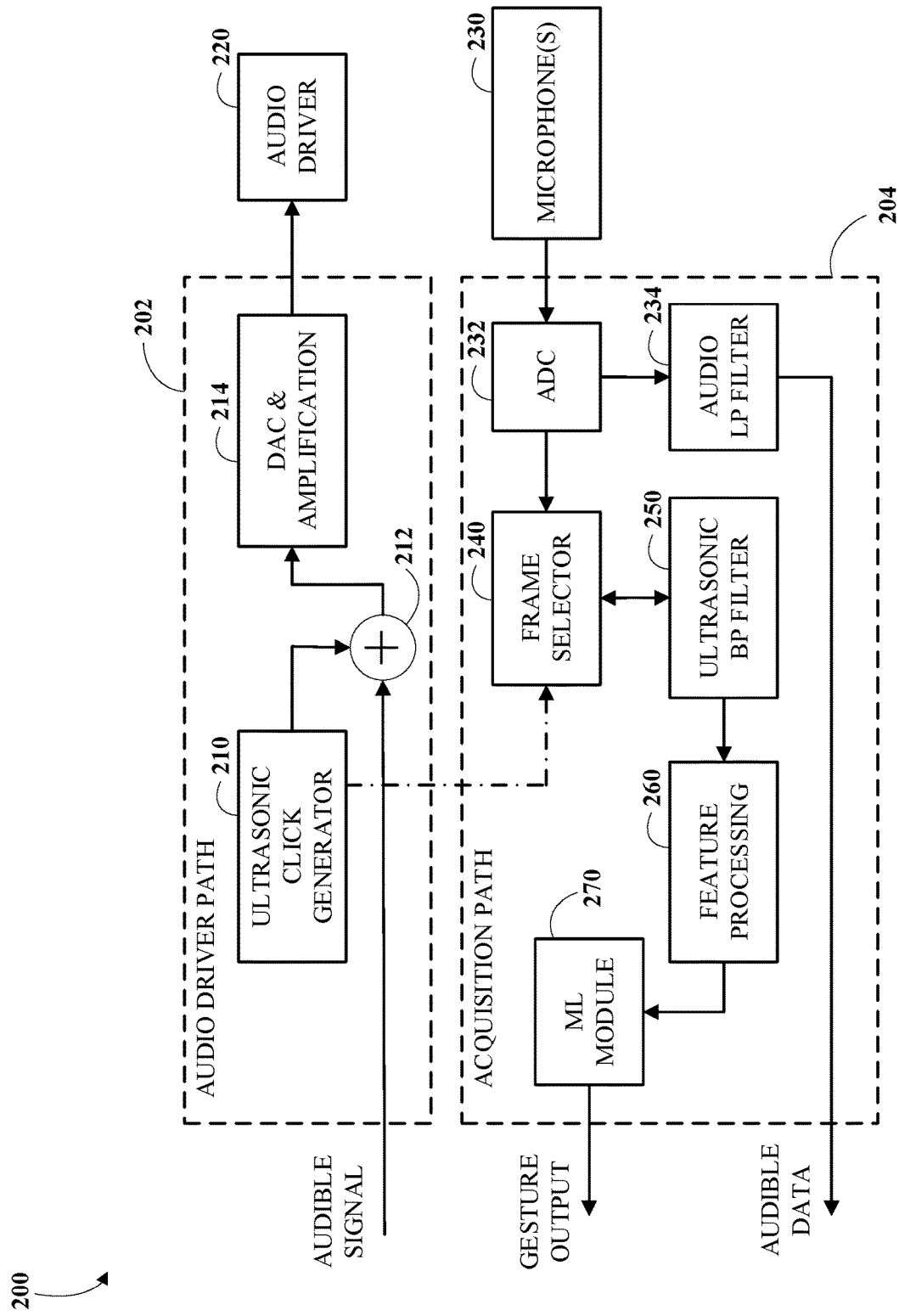
FIG. 2 is a block diagram of an example of a system configured to detect gestures using ultrasonic clicks.

FIG. 2 is a block diagram of an example of a system 200 configured to detect gestures using ultrasonic clicks. The system 200 includes an audio driver path 202 configured to superimpose ultrasonic clicks on an audible signal for play-out, and an acquisition path 204 configured to separate the ultrasonic clicks from audible sounds and detect gestures based on the recordings of the ultrasonic clicks. The audio driver path 202 includes an ultrasonic click generator 210; an adder 212; and a digital-to-analog converter and amplification circuit 214. The output of the audio driver path 202 is input to an audio driver 220 to generate sound waves including the ultrasonic clicks and the audible signal. The acquisition path 204 receives signals captured using one or more microphones 230. The acquisition path 204 includes an analog-to-digital converter circuit 232; an audio low-pass filter 234 for extracting audible data; a frame selector 240 configured to select a frame of samples corresponding to an ultrasonic click; an ultrasonic bandpass filter 250 for extracting audio data corresponding to an ultrasonic click; a feature processing module 260 for determining one or more features of an ultrasonic click based on the audio data; and a machine learning module 270 configured to take audio data and/or features of an ultrasonic click as input and output gesture output, which could include a classification of a gesture performed in a vicinity of the audio driver 220 and the one or more microphones 230 during the ultrasonic click. For example, the audio driver path 202 and the acquisition path 204 could be implemented by a processing apparatus (e.g., the processing apparatus 312). For example, the system 200 could be used to implement the process 400 of FIG. 4. For example, the system 200 could be used to implement the process 600 of FIG. 6.

An input to the audio driver path 202 is an audible signal. The audible signal is the signal that is played at the audio driver 220 under normal operation, for example while playing music, voice from a phone call, or a noise cancelling signal. The audio driver 220 converts the output of the audio driver path 202 to sound waves. The audio driver 220 is a mixed ultrasonic sensing and audio signal output to the physical output.

The one or more microphones 230 could be used for voice pickup under normal operation. The Audible/Conventional Microphone Data is an output of the acquisition path 204. The audible data is the microphone data that can be used as if the ultrasonic system was missing for voice pickup applications (e.g., including applications with beamforming). The gesture output is an output of the acquisition path 204. The gesture output could indicate recognition, presence, identification, detection, and/or classification of a gesture. The gesture output is an additional output generated by processing the ultrasonic click data.

The ultrasonic click generator 210 is configured to generate ultrasonic clicks. Ultrasonic click waveforms are short pulses of narrow-band ultrasonic signals. An ultrasonic click could be shaped by a shaping function. Some parameters of an ultrasonic click include the amplitude, frequency, click-width, and click-repetition rate. For example, the amplitude can be about 10% to 50% of regular audio, frequency from 18 kHz to 25 kHz, click-width about 1 ms, and click-repetition rate about 250 ms. A variety of shaping functions could be used. For example, a square shaping function could be used, which could result in some partially audible clicks. For example, a Gaussian shaping function could be used, which could result in inaudible to the human ear clicks. In some implementations, the amplitude of the signal could be lowered for low power consumption and nearfield applications where there is little or no concern about propagating the ultrasound at larger distances. In some implementations, ultrasonic clicks with multiple amplitudes can be used in quick succession to detect non-linear effects that depend on amplitude. For example, a full amplitude click of 1 ms click-width could be used, followed by a half-amplitude click after 125 ms. The sequence could be repeated every 250 ms.

The ultrasonic signal is added with the audible signal and output to the physical audio driver 220. An ultrasonic click could be superimposed on the audible signal (e.g., a voice signal or a music signal) using the adder 212.

The digital-to-analog conversion and amplification circuit 214 is configured to convert and amplify the signal including the audio signal and an ultrasonic click. Many audio systems designed for playing audible audio signals (e.g., voice or music) work at high enough sample rates (e.g., greater than 128 kHz) and can easily handle audio signals in a low ultrasonic frequency range (e.g., from 18 kHz to 25 kHz).

The analog-to-digital circuit converter 232 converts audio signals captured using the one or more microphones 230 to digital signals. The microphone inputs are digitized as usual. For example, signals in the 18 kHz to 25 kHz frequency range are not challenging for contemporary systems that work at sampling rates of 128 kHz or higher.

The audio low-pass filter 234 to recover an audible signal (e.g., voice or music) from a captured audio signal. For example, the audio low-pass filter 234 could already be present in many devices for other purposes, such as voice processing and compression. The audio low-pass filter 234 could be used to remove the ultrasonic signals without need of further adjustment.

The frame selector 240 gets a synchronizing timing signal from the ultrasonic click generator 210 and selects frames of ultrasonic data either purely from the timing data, or if the processing path has variable jitter (e.g., if the frame selector 240 is operating in a connected mobile device), based also on thresholds on incoming bandpass filtered data. In some implementations, a maximum of the bandpass filtered data is calculated over an initial window of samples selected based on the timing data, and the start-time of the frame is then determined based on a time-offset with respect to the maximum value sample. In some implementations, a threshold value is determined (e.g., as a function of an average energy over the initial window and an absolute threshold), and the start-time of the frame is then determined based on a time-offset with respect to the earliest sample in the initial window that exceeds the threshold. For example, the constant threshold value of 1.8 dB SPL could be used. For example, for more robust results, the threshold could be adapted (e.g., based on an average value) to a lower value automatically if the target is further away from the given microphone or less reflective of the click.

The ultrasonic bandpass filter 250 could serve to select the ultrasonic click based reflected and interfering signal components of the captured audio waveform. Applying the ultrasonic bandpass filter 250 after the frame selector 240 could select only a portion of the data needs to be processed at high resolution, thus reducing computational complexity of the system 200.

There are several ways in which the resulting bandpass filtered ultrasonic signal could be processed to make it more suitable to processing by the machine learning module 270 (e.g., a neural network). The feature processing module 260 could be configured to determine one or more features of the bandpass filtered ultrasonic signal.

Figure 8:
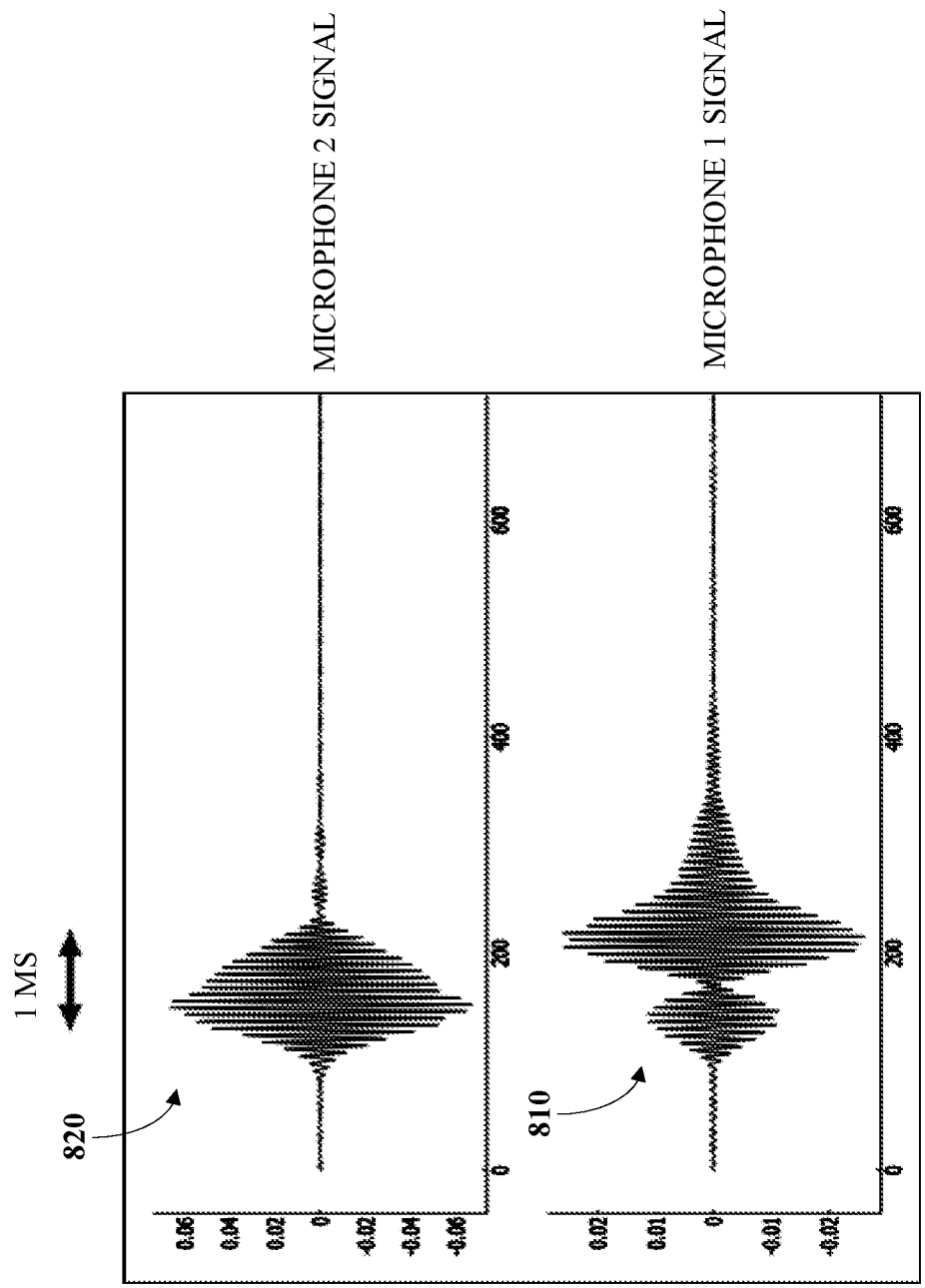
FIG. 8 is a plot of an examples of recordings of an ultrasonic click with no gesture.

For example, the feature processing module 260 could perform background removal. When a wearable device is worn by a user, it could produce a unique signature depending on the user's biometric features, their changeable features (e.g., cloths worn, and hairdo), and the exact position and orientation in which the device is worn by the user. The resulting signal is static (e.g., as shown in FIG. 8) and can be subtracted out before further processing. For example, the background signal could be estimated during a use session, subtracted from an ultrasonic click recording to obtain a residual signal, and the residual signal could be further processed (e.g., input to a neural network) to detect and/or classify a gesture. For example, a background estimation could be based on detecting a steady state in reflected signals that lasts more than about 15 seconds, which could approximately preclude gestures the system is configured to detect.

In some implementations, the static gesture-free background data could be analyzed for user identification. For example, there could be a user enrollment process to enable user identification. In some implementations, a user could wear the device several times in slightly different orientations as part of an enrollment process to establish a user background signal profile. For example, the background signal frame data could be used to train the machine learning module 270 (e.g., a neural network).

For example, the feature processing module 260 could determine an envelope, an amplitude, and/or a phase of the bandpass filtered ultrasonic signal. For example, the bandpass filtered ultrasonic signal could be processed to calculate the envelope using a Hilbert transform. For example, the amplitude and phase can be detected using short-time single frequency Fourier transform. Detecting and/or classifying a gesture based on these features could result in compressed and more relevant data than using the bandpass filtered ultrasonic waveform directly. In some implementations, the whole frame of bandpass filtered ultrasonic data could be used to determine the gesture output (e.g., by inputting the whole frame of bandpass filtered ultrasonic data to the machine learning module 270).

For example, the feature processing module 260 could determine Doppler measurements for the bandpass filtered ultrasonic signal. The bandpass filtered ultrasonic signal could be enhanced to detect small shifts in frequency, which could provide indications of whether a hand gesture is in the motion state where it is moving toward the device or away from it. For example, the Doppler shifted frequency $[f'=f\_0 \times (1/(1+v/c))]$ could be detected with a short-time Fast Fourier Transform (FFT) or an equivalent algorithm, and subtracted from the nominal frequency (e.g., $f\_0=20$ kHz) of the ultrasonic click to determine a Doppler shift.

For example, the feature processing module 260 could apply time-gain-compensation (TGC), which can be used to enhance and amplify data only in the time and distance range where the gesture is likely to occur. For example, TGC could be applied by multiplying each frame of the captured microphone signal with a shape curve (e.g., the gain curve 700 depicted in FIG. 7) to emphasize signal corresponding to a range of interest for gesture detection.

Figure 5:
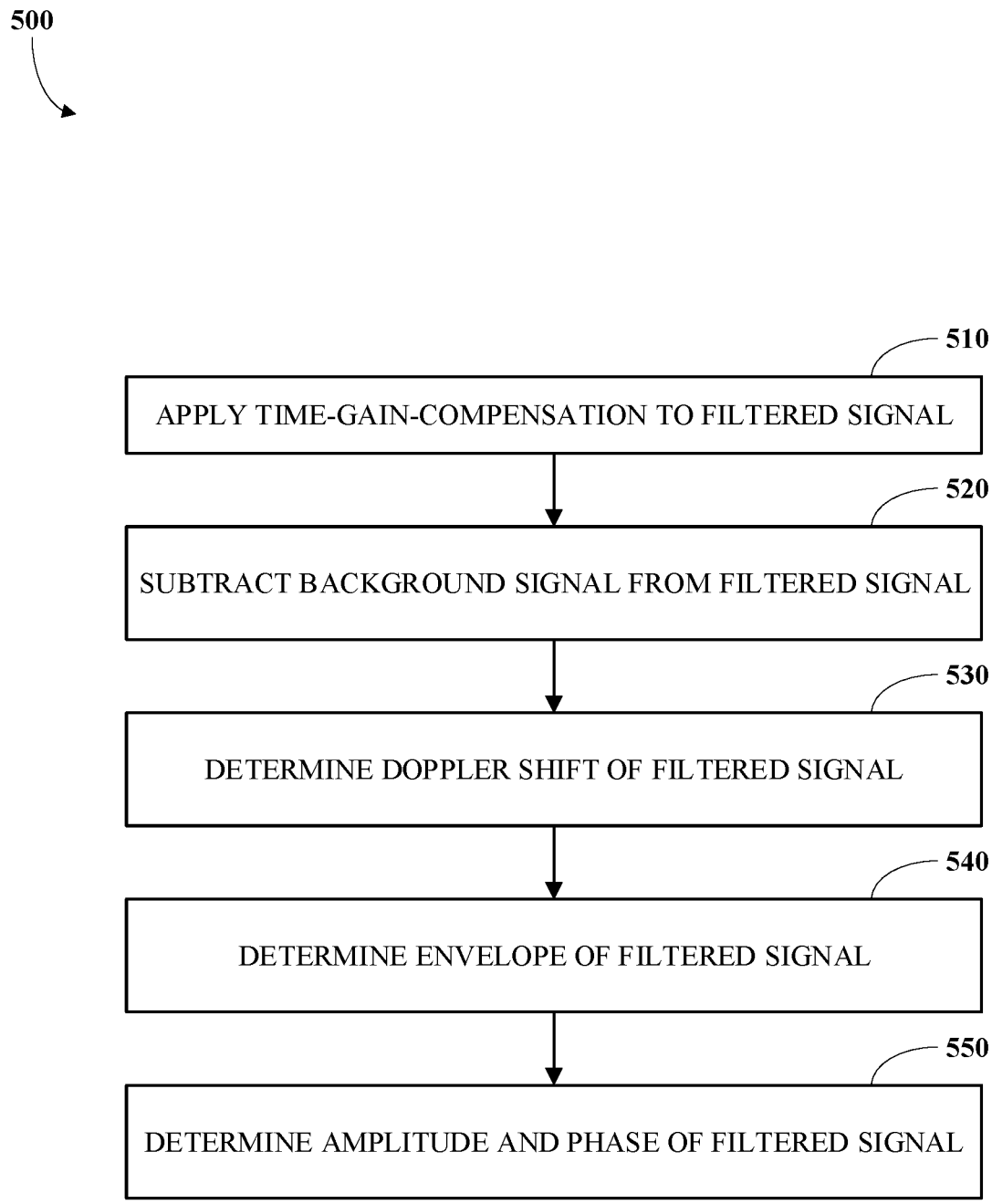
FIG. 5 is a flowchart of an example of a process for applying signal processing to determine features of an ultrasonic signal.

For example, the feature processing module 260 could implement the process 500 of FIG. 5.

The machine learning module 270 (e.g., a neural network or a support vector machine) could be trained to take data based on one or more bandpass filtered ultrasonic signals (e.g., time-domain samples, frequency-domain samples, and/or other features determined by the feature processing module 260) as input and output a classification of a gesture. For example, depending on the complexity of the gesture and recognition application, the machine learning module 270 could include a deep neural network, a convolutional neural network, and/or a recurrent neural network. For example, more complex networks could be deployed on a connected mobile application or edge computing infrastructure, while simpler networks can be deployed on-device reducing data communication needs. In some implementations, data from multiple microphones can be routed to the same neural network for clutter and noise rejection (e.g., moving hat rim instead of gesture) and recognizing more complex gestures. In some implementations, a background signal could be input to the machine learning module 270 along with a corresponding bandpass filtered ultrasonic signal. Manually labeled data could be used for training the machine learning module 270. In some implementations, training data for gestures is generated, which are labeled based on three-dimensional visual tracking of the gestures using two cameras to determine the ground truth labels. For example, the machine learning module 270 could be trained using the full frame waves. For example, the machine learning module 270 could be trained using envelope and Doppler shift vector.

Figure 3:
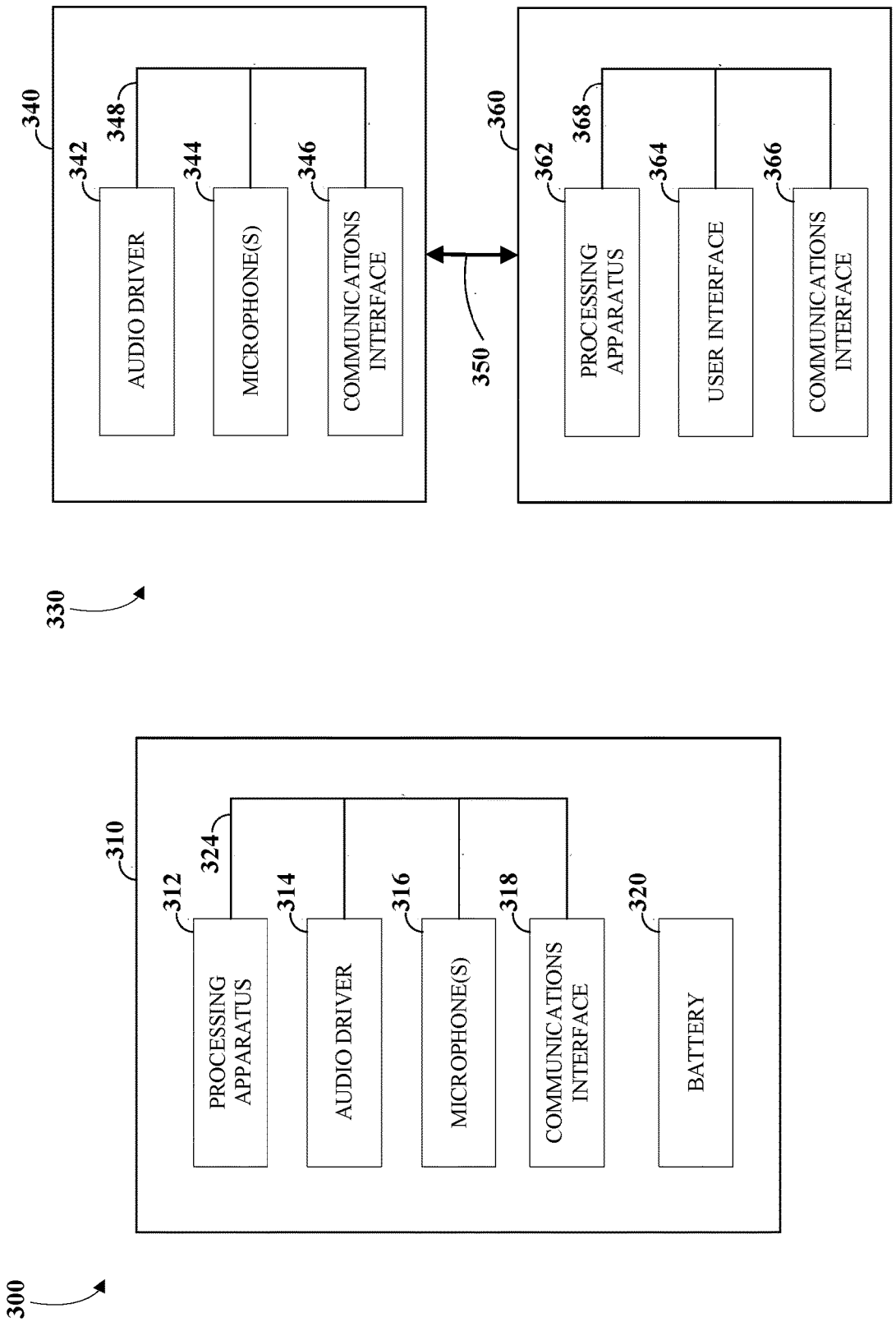
FIG. 3A is a block diagram of an example of a system configured for gesture detection using ultrasonic clicks.
FIG. 3B is a block diagram of an example of a system configured for gesture detection using ultrasonic clicks.

FIG. 3A is a block diagram of an example of a system 300 configured for gesture detection using ultrasonic clicks. The system 300 includes a gesture detection device 310 (e.g., a wearable device, a handheld device, or a desktop device), which can, for example, be the wearable device 100 shown in FIGS. 1A-B.

The gesture detection device 310 includes a processing apparatus 312 that is configured to control the audio driver 314 and access recordings captured using one or more microphones 316. The gesture detection device 310 includes a communications interface 318 for transferring data (e.g., indications of detected gestures) to other devices. The gesture detection device 310 includes a battery 320 for powering the gesture detection device 310. The components of the gesture detection device 310 can communicate with each other via the bus 324.

The processing apparatus 312 can be configured to perform signal processing to detect gestures based on ultrasonic pulses (e.g., ultrasonic clicks) played using the audio driver 314 and captured using one or more microphones 316. For example, the processing apparatus can be configured to implement the audio driver path 202 and the acquisition path 204 of FIG. 2. The processing apparatus 312 can include one or more processors having single or multiple processing cores. The processing apparatus 312 can include memory, such as a random-access memory device (RAM), flash memory, or another suitable type of storage device such as a non-transitory computer-readable memory. The memory of the processing apparatus 312 can include executable instructions and data that can be accessed by one or more processors of the processing apparatus 312.

For example, the processing apparatus 312 can include one or more dynamic random access memory (DRAM) modules, such as double data rate synchronous dynamic random-access memory (DDR SDRAM). In some implementations, the processing apparatus 312 can include a digital signal processor (DSP). In some implementations, the processing apparatus 312 can include an application specific integrated circuit (ASIC). For example, the processing apparatus 312 can include a graphics processing unit (GPU).

The audio driver 314 is configured to convert electrical signals to sound waves in a medium (e.g., in air or water). For example, the audio driver 314 can include one or more speakers. The audio driver 314 can be configured to play audible signals, such as music, voice from a phone call, or a noise cancelling signal. The audio driver 314 have sufficient bandwidth to play some ultrasonic sounds. The audio driver 314 can be a mixed ultrasonic sensing and audio signal output to the physical medium.

The one or more microphones 316 can be configured to detect sound in a certain range of frequencies (e.g., up to 64 kHz) and convey information constituting sounds as electrical signals (e.g., analog or digital signals). For example, the one or more microphones 316 can include a dynamic microphone, a condenser microphone, or a piezoelectric microphone. In some implementations, the one or more microphones 316 include digital-to-analog converters. In some implementations, the one or more microphones 316 are held in a fixed orientation with respect to one another, forming an array of microphones that can be used for beamforming or other processing to spatially tune reception of sound waves. For example, recordings from multiple microphones of the one or more microphones 316 can be combined to reject far-field noise signals.

The communications interface 318 can enable communications with a personal computing device (e.g., a smartphone, a tablet, a laptop computer, or a desktop computer). For example, the communications interface 318 can be used to receive commands controlling functions in the gesture detection device 310. For example, the communications interface 318 can be used to transfer indications (e.g., command codes or text) of detected gestures to a personal computing device. For example, the communications interface 318 can include a wired interface, such as a high-definition multimedia interface (HDMI), a universal serial bus (USB) interface, or a FireWire interface. For example, the communications interface 318 can include a wireless interface, such as a Bluetooth interface, a ZigBee interface, and/or a Wi-Fi interface.

The battery 320 can power the gesture detection device 310 and/or its peripherals. For example, the battery 320 can be charged wirelessly or through a micro-USB interface.

Figure 4:
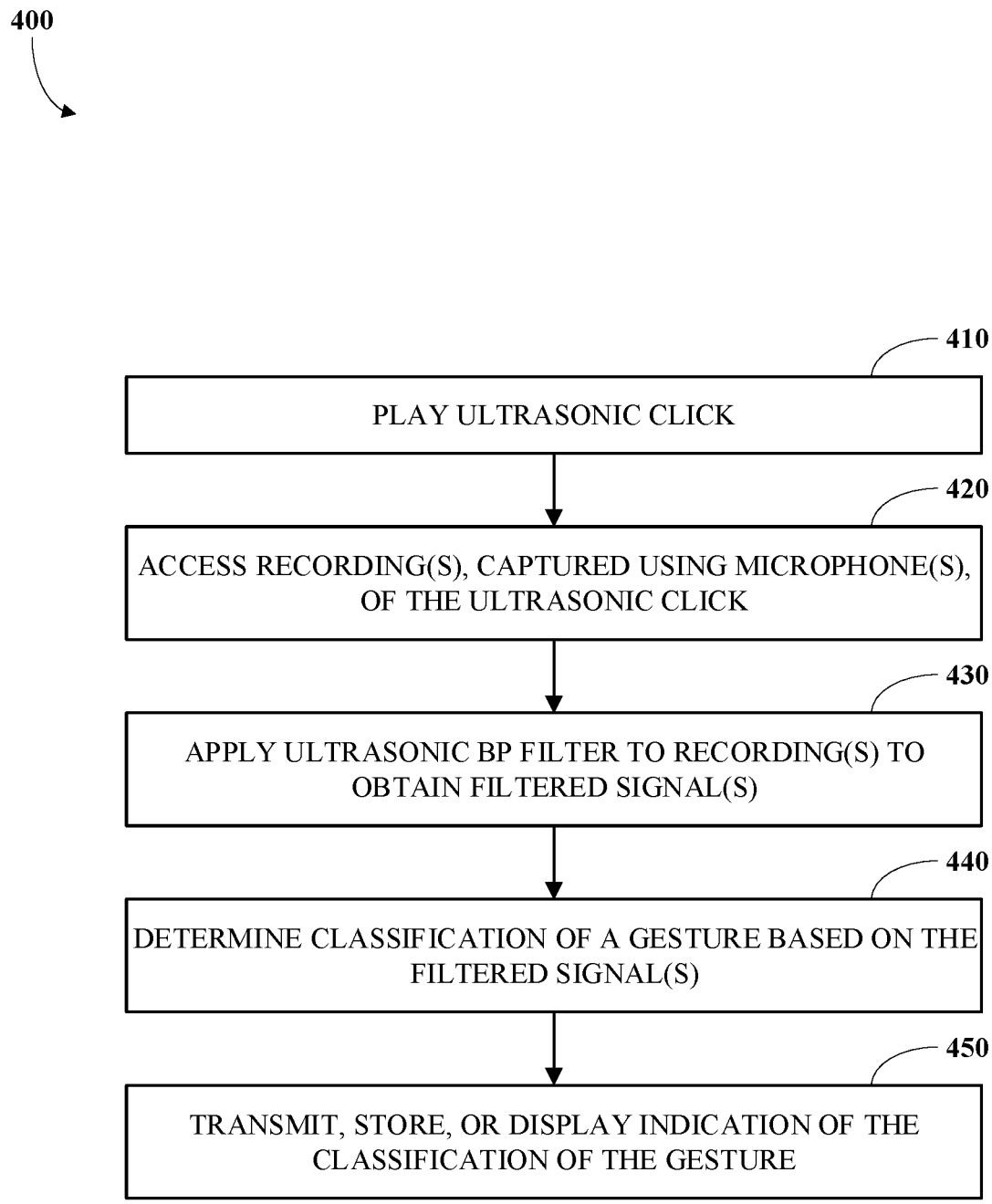
FIG. 4 is a flowchart of an example of a process for detecting a gesture using an ultrasonic click.
Figure 6:
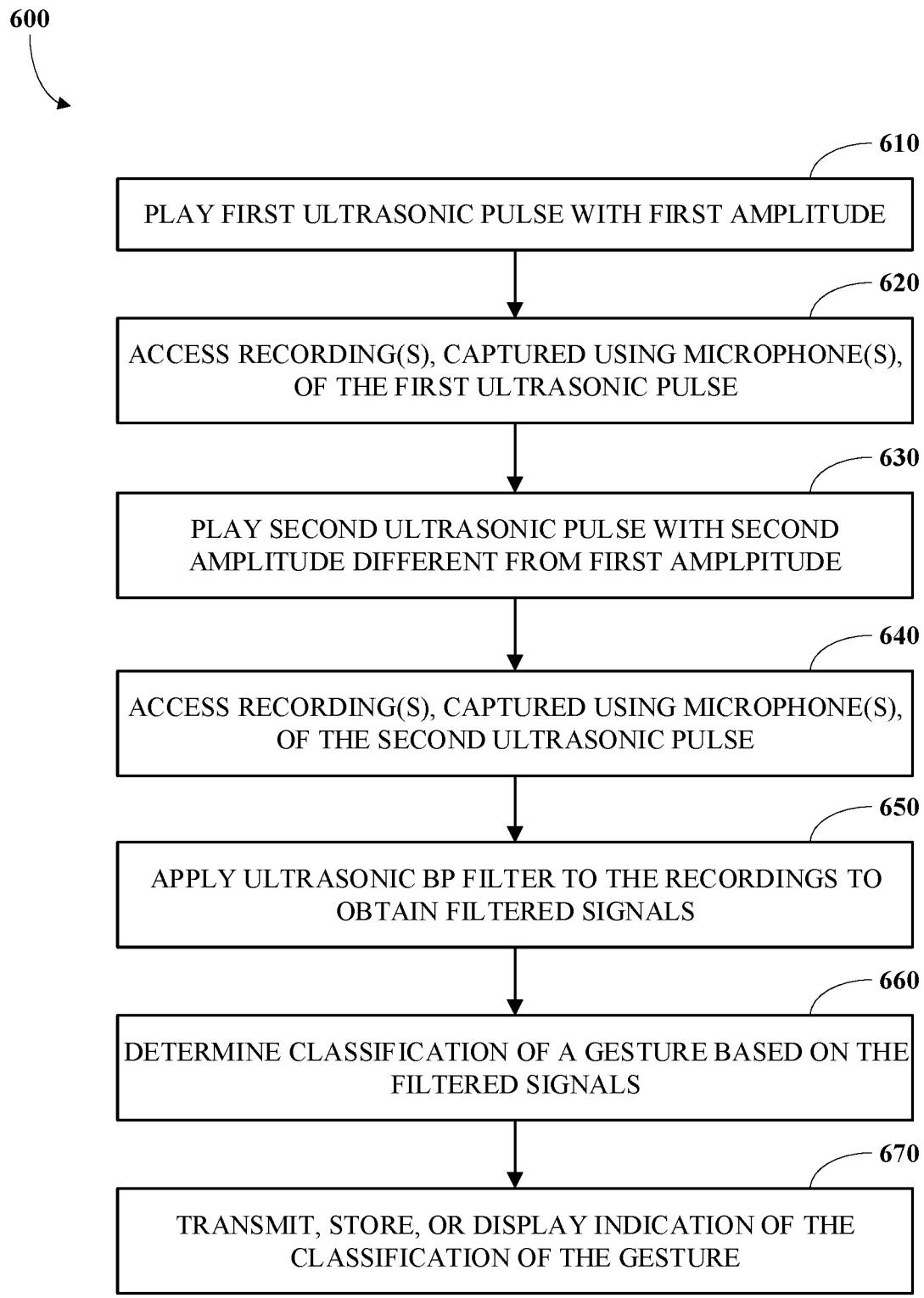
FIG. 6 is a flowchart of an example of a process for detecting a gesture using an ultrasonic pulses of varying amplitudes.

The system 300 can implement some or all of the techniques described in this disclosure, such as the process 400 described in FIG. 4 and/or the process 600 described in FIG. 6.

FIG. 3B is a block diagram of an example of a system 330 configured for gesture detection using ultrasonic clicks. The system 330 includes a gesture detection device 340 and a personal computing device 360 that communicate via a communications link 350. The gesture detection device 340 can, for example, be the wearable device 100 shown in FIGS. 1A-B. The personal computing device 360 can, for example, be a smartphone, a tablet, or laptop computer.

The gesture detection device 340 includes an audio driver 342 that is configured to play sounds (e.g., audible sounds and ultrasonic sounds). The gesture detection device 340 includes one or more microphones 344 configured to capture sounds as electrical signals. The gesture detection device 340 includes a communications interface 346 configured to transfer audio data via the communication link 350 to the personal computing device 360. Data can be passed between the components of the gesture detection device 340 via a bus 348.

The personal computing device 360 includes a processing apparatus 362 that is configured to receive, using a communications interface 366, audio data from the one or more microphones 344. The processing apparatus 362 can be configured to perform signal processing to generate indications of gestures based on audio data captured using the one or more microphones 344 that include ultrasonic pulses (e.g., ultrasonic clicks) play using the audio driver 342. Data can be passed between the components of the personal computing device 360 via a bus 368.

The audio driver 342 is configured to convert electrical signals to sound waves in a medium (e.g., in air or water). For example, the audio driver 342 can include one or more speakers. The audio driver 342 can be configured to play audible signals, such as music, voice from a phone call, or a noise cancelling signal. The audio driver 342 have sufficient bandwidth to play some ultrasonic sounds. The audio driver 342 can be a mixed ultrasonic sensing and audio signal output to the physical medium.

The one or more microphones 344 can be configured to detect sound in a certain range of frequencies (e.g., up to 64 kHz) and convey information constituting sounds as electrical signals (e.g., analog or digital signals). For example, the one or more microphones 344 can include a dynamic microphone, a condenser microphone, or a piezoelectric microphone. In some implementations, the one or more microphones 344 include digital-to-analog converters. In some implementations, the one or more microphones 344 are held in a fixed orientation with respect to one another, forming an array of microphones that can be used for beamforming or other processing to spatially tune reception of sound waves. For example, recordings from multiple microphones of the one or more microphones 344 can be combined to reject far-field noise signals.

The communications link 350 can be a wired communications link or a wireless communications link. The communications interface 346 and the communications interface 366 can enable communications over the communications link 350. For example, the communications interface 346 and the communications interface 366 can include an HDMI port or other interface, a USB port or other interface, a FireWire interface, a Bluetooth interface, a ZigBee interface, and/or a Wi-Fi interface. For example, the communications interface 346 and the communications interface 366 can be used to audio data from the gesture detection device 340 to the personal computing device 360 for signal processing to detect gestures based on audio data from the one or more microphones 344.

The processing apparatus 362 can include one or more processors having single or multiple processing cores. The processing apparatus 362 can include memory, such as RAM, flash memory, or another suitable type of storage device such as a non-transitory computer-readable memory. The memory of the processing apparatus 362 can include executable instructions and data that can be accessed by one or more processors of the processing apparatus 362. For example, the processing apparatus 362 can include one or more DRAM modules, such as DDR SDRAM.

In some implementations, the processing apparatus 362 can include a DSP. In some implementations, the processing apparatus 362 can include an integrated circuit, for example, an ASIC. For example, the processing apparatus 362 can include a graphics processing unit (GPU). The processing apparatus 362 can exchange data (e.g., audio data or indications of gestures) with other components of the personal computing device 360 via a bus 368.

The personal computing device 360 can include a user interface 364. For example, the user interface 364 can include a touchscreen display for presenting images and/or messages to a user and receiving commands from a user. For example, the user interface 364 can include a button or switch enabling a person to manually turn the personal computing device 360 on and off. In some implementations, commands (e.g., play audio, pause audio, or start call) received via the user interface 364 can be passed on to the gesture detection device 340 via the communications link 350.

The gesture detection device 340 and/or the personal computing device 360 can be used to implement some or all of the techniques described in this disclosure, such as the process 400 of FIG. 4 and/or the process 600 described in FIG. 6.

FIG. 4 is a flowchart of an example of a process 400 for detecting a gesture using an ultrasonic click. The ultrasonic click could be a modulated audio pulse with a duration less than one hundred periods of a modulation frequency waveform of the ultrasonic click. The process 400 includes playing 410 an ultrasonic click using an audio driver; accessing 420 a recording, captured using a microphone, of the ultrasonic click; applying 430 an ultrasonic bandpass filter to the recording to obtain a filtered signal; determining 440 a classification of a gesture based on the filtered signal; and transmitting, storing, or displaying 450 an indication of the classification of the gesture. For example, the process 400 could be implemented using the wearable device 100 of FIG. 1. For example, the process 400 could be implemented using the system 200 of FIG. 2. For example, the process 400 could be implemented by the system 300 of FIG. 3A. For example, the process 400 could be implemented by the system 330 of FIG. 3B.

The process 400 includes playing 410 an ultrasonic click using an audio driver (e.g., the audio driver 314 or the audio driver 342). The ultrasonic click could be a modulated audio pulse with a duration less than one hundred periods of a modulation frequency waveform of the ultrasonic click. In some implementations, the ultrasonic click has a duration less than fifty periods of a modulation frequency waveform of the ultrasonic click. In some implementations, the ultrasonic click has a duration less than ten periods of a modulation frequency waveform of the ultrasonic click. In some implementations, the ultrasonic click has a duration between two and one hundred periods of a modulation frequency waveform of the ultrasonic click. In some implementations, the ultrasonic click has a duration between ten and thirty periods of a modulation frequency waveform of the ultrasonic click. In some implementations, the ultrasonic click has a duration of approximately 20 periods of a modulation frequency waveform of the ultrasonic click. For example, the ultrasonic click could have a modulation frequency near or above a typical upper cutoff frequency for human hearing and below half the sampling rate for an off-the-shelf audio system including the audio driver (e.g., a speaker) and one or more microphones (e.g., a system designed for playing and recording voice signals). For example, the modulation frequency waveform could be at a frequency between 18 kilohertz and 25 kilohertz. For example, the modulation frequency waveform could be at a frequency between 20 kilohertz and 64 kilohertz. For example, the modulation frequency waveform could be at a frequency of approximately 20 kilohertz. The ultrasonic click could be windowed by a shaping function that sets the duration (e.g., 500 microseconds, 250 microseconds, 1 millisecond, or 5 milliseconds) of the ultrasonic click. For example, the ultrasonic click could be windowed by a Gaussian shaping function. In some implementations, ultrasonic clicks are played 410 periodically (e.g., with a period of 250 milliseconds) to enable detection of gestures (e.g., hand gestures performed near a wearable device including the audio driver, such as the gestures depicted in FIGS. 10A-10B) occurring at unknown times.

The process 400 includes accessing 420 a recording, captured using a microphone (e.g., the one or more microphones 316 or the one or more microphones 344), of the ultrasonic click. For example, the recording could include a frame of audio samples selected (e.g., using the frame selector 240) as corresponding to the ultrasonic click. For example, the recording could be accessed 420 from a microphone via a bus (e.g., the bus 324). In some implementations, the recording could be accessed 420 via a communications link (e.g., the communications link 350). For example, the recording could be accessed 420 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the recording could be accessed 420 via communications interface 366. For example, the recording could be accessed 420 by reading the recording from a memory (e.g., memory of the processing apparatus 312 or memory of the processing apparatus 362).

The process 400 includes applying 430 an ultrasonic bandpass filter (e.g., the ultrasonic bandpass filter 250) to the recording to obtain a filtered signal. The bandpass filter could be tuned to pass signals in a frequency range in which the ultrasonic clock is expected to be received. For example, the bandpass filter could be tuned to have a lower cutoff frequency at 20 kHz and an upper cutoff frequency at 25 kHz. For example, the bandpass filter could be implemented with software running on a processing apparatus (e.g., the processing apparatus 312 or the processing apparatus 362).

The process 400 includes determining 440 a classification of a gesture based on the filtered signal. For example, determining 440 the classification of the gesture based on the filtered signal could include inputting data based on the filtered signal to a machine learning module (e.g., the machine learning module 270) to obtain the classification of the gesture. The data based on the filtered signal could include some or all of the time-domain samples of the filtered signal, some or all of the frequency-domain samples of the filtered signal, modified samples of the filtered signal (e.g., a residual resulting from subtracting a background signal or a result of applying time-gain-compensation (TGC) to the filtered signal), and/or other features (e.g., an envelope, a Doppler shift, an amplitude, or a phase) determined based on the filtered signal. For example, determining 440 the classification of the gesture based on the filtered signal could include implementing the process 500 of FIG. 5.

The process 400 includes transmitting, storing, or displaying 450 an indication of the classification of the gesture. For example, the indication of the classification of the gesture could include a command code (e.g., codes for commands to play or pause audible audio content be played through the audio driver, to skip to a next or previous audio content track, to accept, or decline) that is mapped to the gesture. For example, the indication of the classification of the gesture could include text or another symbol that is mapped to the gesture. For example, the indication of the classification of the gesture could be transmitted 450 to an external device (e.g., a personal computing device) for display or storage. For example, the indication of the classification of the gesture could be transmitted 450 via the communications interface 318. For example, the indication of the classification of the gesture could be displayed 450 in the user interface 364. For example, the indication of the classification of the gesture could be stored 450 in memory of the processing apparatus 312 or in memory of the processing apparatus 362.

Multiple microphones could be used to capture multiple recordings the ultrasonic click. Using multiple microphones could enable improvements such as enabling the suppression of unwanted far-field signals occurring in the ultrasonic frequency range that are unrelated to a gesture being performed near a device implementing the process 400. Using multiple microphones could also provide robustness via redundancy in the event microphone failure or degradation. In some implementations, the microphone is a first microphone, the recording is a first recording, and the filtered signal is a first filtered signal, and the process 400 includes accessing 420 a second recording, captured using a second microphone, of the ultrasonic click; applying 430 the ultrasonic bandpass filter to the second recording to obtain a second filtered signal; and determining 440 the classification of the gesture based on the second filtered signal. For example, determining 440 the classification of the gesture could include inputting data based on the second filtered signal to a machine learning module (e.g., the machine learning module 270) to obtain the classification of the gesture.

Ultrasonic clicks at multiple amplitudes could be used to measure non-linear effects of the acoustic response in the presence of a gesture near a device implementing the process 400, which could aid in gesture detection. Ultrasonic clicks of different amplitudes could be played in a periodic sequence. In some implementations, the ultrasonic click is a first ultrasonic click, the recording is a first recording, and the filtered signal is a first filtered signal; and the process 400 includes: playing 410 a second ultrasonic click using the audio driver, wherein the second ultrasonic click has an amplitude different from a corresponding amplitude of the first ultrasonic click; accessing 420 a second recording, captured using the microphone, of the second ultrasonic click; applying 430 the ultrasonic bandpass filter to the second recording to obtain a second filtered signal; and determining 440 the classification of the gesture based on the second filtered signal. For example, one of the amplitudes of the first ultrasonic click and the second ultrasonic click could be between twenty-five and seventy-five percent of the other amplitude of the pair. For example, the amplitude of the second ultrasonic click could be half of the amplitude of the first ultrasonic click. For example, a full amplitude click of 0.5 ms click-width could be used, followed by a half-amplitude click after 125 ms, and the sequence could be repeated every 250 ms.

For example, the process 400 could be repeated periodically (e.g., every 250 ms) to detect gestures as they are performed at unknown times. In some implementations, data based on multiple ultrasonic clicks could be buffered and portions of this buffered data corresponding to window of time including multiple clicks could be input to a machine learning module (e.g., the machine learning module 270) to obtain a classification of a gesture. For example, considering the response to a sequence of ultrasonic clicks (e.g., of the same amplitude or of different amplitudes) could enable detecting an evolution of the state of a dynamic gesture.

FIG. 5 is a flowchart of an example of a process 500 for applying signal processing to determine features of an ultrasonic signal. The process 500 includes applying 510 time-gain-compensation to the filtered signal; subtracting 520 a background signal from the filtered signal to obtain a residual signal; determining 530 a Doppler shift of the filtered signal; determining 540 an envelope of the filtered signal; and determining 550 an amplitude and a phase of the filtered signal. For example, the process 500 can be implemented by the wearable device 100 of FIG. 1. For example, the process 500 can be implemented using the feature processing module 260 of FIG. 2. For example, the process 500 can be implemented by the processing apparatus 312 of FIG. 3A. For example, the process 500 can be implemented by the processing apparatus 362 of FIG. 3B.

The process 500 includes applying 510 time-gain-compensation to the filtered signal. Applying 510 time-gain-compensation can enhance components of the ultrasonic signal corresponding to acoustic interactions with an object (e.g., a hand) used to perform a gesture at an expected distance from a device that plays and records the ultrasonic click, while suppressing noise in the ultrasonic frequency range (e.g., noise from far-field sources). For example, the time-gain-compensation can have a peak corresponding to a range of distances from the microphone between three centimeters and six centimeters. For example, the time-gain-compensation can use the gain curve 700 of FIG. 7.

The process 500 includes subtracting 520 a background signal from the filtered signal to obtain a residual signal. For example, the background signal can be estimated during a use session to model a current state of a user and the way that a wearable device is worn during the use session. For example, a background signal estimation can be based on detecting a steady state in reflected signals that lasts more than about 15 seconds, which can approximately preclude gestures that the system is configured to detect. In some implementations, the background signal is determined based on bandpass filtered recordings of ultrasonic clicks, played using the audio driver and captured using the microphone during a calibration period at a start of a gesturing session. The classification of the gesture can be determined based on the residual signal. For example, data based on the residual signal can be input to a machine learning module (e.g., the machine learning module 270) to obtain a classification of a gesture.

The process 500 includes determining 530 a Doppler shift of the filtered signal. The Doppler shift can provide information about dynamics of gesture (e.g., whether a hand making the gesture is moving towards or away from the device being used to detect the gesture). For example, the Doppler shifted frequency can be detected with a short-time Fast Fourier Transform (FFT) or an equivalent algorithm, and subtracted from the nominal frequency (e.g., 20 kHz) of the ultrasonic click to determine 530 the Doppler shift. The classification of the gesture can be determined based on the Doppler shift. For example, data based on the Doppler shift can be input to a machine learning module (e.g., the machine learning module 270) to obtain a classification of a gesture.

The process 500 includes determining 540 an envelope of the filtered signal. For example, a Hilbert transform can be applied to the filtered signal to determine 540 the envelope of the filtered signal. The classification of the gesture can be determined based on the envelope. For example, data based on the envelope can be input to a machine learning module (e.g., the machine learning module 270) to obtain a classification of a gesture.

The process 500 includes determining 550 an amplitude and a phase of the filtered signal. For example, the amplitude and phase can be determined 550 using a short-time single frequency Fourier transform. The classification of the gesture can be determined based on the amplitude and the phase. For example, data based on the amplitude and the phase can be input to a machine learning module (e.g., the machine learning module 270) to obtain a classification of a gesture.

The process 500 of FIG. 5 is one example of a process that determines a particular combination of features of an ultrasonic signal for use in detecting a gesture. It is noted that many other possible combinations of features can be determined and used to detect a gesture. One or more of the described operations of the process 500 can be omitted or swapped out for operations to determine alternative features. For example, application of time-gain-compensation or the subtraction of a background signal can be omitted from the process 500.

FIG. 6 is a flowchart of an example of a process 600 for detecting a gesture using an ultrasonic pulses of varying amplitudes. Ultrasonic pulses at multiple amplitudes can be used to measure non-linear effects of the acoustic response in the presence of a gesture near a device implementing the process 600, which can aid in gesture detection. For example, ultrasonic pulses of different amplitudes can be played in a periodic sequence. For example, the ultrasonic pulses can be ultrasonic clicks. The process 600 includes playing 610 a first ultrasonic pulse using the audio driver; accessing 620 a first recording, captured using the microphone, of the first ultrasonic pulse; playing 630 a second ultrasonic pulse using the audio driver, wherein the second ultrasonic pulse has an amplitude different from a corresponding amplitude of the first ultrasonic pulse; accessing 640 a second recording, captured using the microphone, of the second ultrasonic pulse; applying 650 an ultrasonic bandpass filter to the first recording to obtain a first filtered signal, and to the second recording to obtain a second filtered signal; determining 660 a classification of a gesture based on the first filtered signal and the second filtered signal; and transmitting, storing, or displaying 670 an indication of the classification of the gesture. For example, the process 600 can be implemented using the wearable device 100 of FIG. 1. For example, the process 600 can be implemented using the system 200 of FIG. 2. For example, the process 600 can be implemented by the system 300 of FIG. 3A. For example, the process 600 can be implemented by the system 330 of FIG. 3B.

The process 600 includes playing 610 a first ultrasonic pulse using the audio driver (e.g., the audio driver 314 or the audio driver 342). The first ultrasonic pulse can be a modulated audio pulse. For example, the first ultrasonic pulse can have a modulation frequency near or above a typical upper cutoff frequency for human hearing and below half the sampling rate for an off-the-shelf audio system including the audio driver (e.g., a speaker) and one or more microphones (e.g., a system designed for playing and recording voice signals). For example, the modulation frequency waveform can be at a frequency between 18 kilohertz and 25 kilohertz. The first ultrasonic pulse can be windowed by a shaping function that sets the duration (e.g., 500 microseconds, 2 milliseconds, 10 milliseconds, or 50 milliseconds) of the first ultrasonic pulse. For example, the first ultrasonic pulse can be windowed by a Gaussian shaping function. In some implementations, ultrasonic pulses are played 610 periodically (e.g., with a period of 250 milliseconds) to enable detection of gestures (e.g., hand gestures performed near a wearable device including the audio driver, such as the gestures depicted in FIGS. 10A-10B) occurring at unknown times.

The process 600 includes playing 630 a second ultrasonic pulse using the audio driver (e.g., the audio driver 314 or the audio driver 342). The second ultrasonic pulse has an amplitude different from a corresponding amplitude of the first ultrasonic pulse. For example, one of the amplitudes of the first ultrasonic pulse and the second ultrasonic pulse is between twenty-five and seventy-five percent of the other amplitude of the pair. In some implementations, the amplitude of the second ultrasonic pulse is half of the amplitude of the first ultrasonic pulse. In some implementations, the second ultrasonic pulse can have the same modulation frequency waveform and duration as the first ultrasonic pulse. For example, the first ultrasonic pulse and the second ultrasonic pulse can be modulated with a modulation frequency waveform that is at a frequency between 18 kilohertz and 25 kilohertz. For example, the second ultrasonic pulse can be windowed by a Gaussian shaping function. The second ultrasonic pulse can be played 630 at a fixed delay (e.g., 125 milliseconds) after the first ultrasonic pulse is played 610.

The process 600 includes accessing 620 a first recording, captured using a microphone (e.g., the one or more microphones 316 or the one or more microphones 344), of the first ultrasonic pulse. For example, the first recording can include a frame of audio samples selected (e.g., using the frame selector 240) as corresponding to the first ultrasonic pulse. For example, the recording can be accessed 620 from the microphone via a bus (e.g., the bus 324). In some implementations, the recording can be accessed 620 via a communications link (e.g., the communications link 350). For example, the recording can be accessed 620 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the recording can be accessed 620 via communications interface 366. For example, the recording can be accessed 620 by reading the recording from a memory (e.g., memory of the processing apparatus 312 or memory of the processing apparatus 362).

The process 600 includes accessing 640 a second recording, captured using the microphone (e.g., the one or more microphones 316 or the one or more microphones 344), of the second ultrasonic pulse. For example, the second recording can include a frame of audio samples selected (e.g., using the frame selector 240) as corresponding to the first ultrasonic pulse. For example, the recording can be accessed 640 from the microphone via a bus (e.g., the bus 324). In some implementations, the recording can be accessed 640 via a communications link (e.g., the communications link 350). For example, the recording can be accessed 640 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the recording can be accessed 640 via communications interface 366. For example, the recording can be accessed 640 by reading the recording from a memory (e.g., memory of the processing apparatus 312 or memory of the processing apparatus 362).

The process 600 includes applying 650 an ultrasonic bandpass filter (e.g., the ultrasonic bandpass filter 250) to the first recording to obtain a first filtered signal, and applying 650 the ultrasonic bandpass filter to the second recording to obtain a second filtered signal. The bandpass filter can be tuned to pass signals in a frequency range in which the first ultrasonic pulse and the second ultrasonic pulse are expected to be received. For example, the bandpass filter can be tuned to have a lower cutoff frequency at 20 kHz and an upper cutoff frequency at 25 kHz.

The process 600 includes determining 660 a classification of a gesture based on the first filtered signal and the second filtered signal. In some implementations, determining 660 the classification of the gesture includes inputting data based on the first filtered signal and the second filtered signal to a machine learning module (e.g., the machine learning module 270) to obtain the classification of the gesture. The data based on the filtered signal can include some or all of the time-domain samples of the first filtered signal and the second filtered signal, some or all of the frequency-domain samples of the first filtered signal and the second filtered signal, modified samples of the first filtered signal and the second filtered signal (e.g., a residual resulting from subtracting a background signal or a result of applying time-gain-compensation (TGC) to the first filtered signal and the second filtered signal), and/or other features (e.g., an envelope, a Doppler shift, an amplitude, or a phase) determined based on the first filtered signal and the second filtered signal. For example, determining 660 the classification of the gesture based on the first filtered signal and the second filtered signal can include implementing the process 500 of FIG. 5 for the first filtered signal and the second filtered signal.

The process 600 includes transmitting, storing, or displaying 670 an indication of the classification of the gesture. For example, the indication of the classification of the gesture can include a command code (e.g., codes for commands to play or pause audible audio content be played through the audio driver, to skip to a next or previous audio content track, to accept, or decline) that is mapped to the gesture. For example, the indication of the classification of the gesture can include text or another symbol that is mapped to the gesture. For example, the indication of the classification of the gesture can be transmitted 670 to an external device (e.g., a personal computing device) for display or storage. For example, the indication of the classification of the gesture can be transmitted 670 via the communications interface 318. For example, the indication of the classification of the gesture can be displayed 670 in the user interface 364. For example, the indication of the classification of the gesture can be stored 670 in memory of the processing apparatus 312 or in memory of the processing apparatus 362.

Multiple microphones can be used to capture multiple recordings the first ultrasonic pulse and the second ultrasonic pulse. Using multiple microphones can enable improvements such as enabling the suppression of unwanted far-field signals occurring in the ultrasonic frequency range that are unrelated to a gesture being performed near a device implementing the process 600. Using multiple microphones can also provide robustness via redundancy in the event microphone failure or degradation. In some implementations, the microphone is a first microphone, and the process 600 includes: accessing 620 a third recording, captured using a second microphone, of the first ultrasonic pulse; accessing 640 a fourth recording, captured using the second microphone, of the second ultrasonic pulse; applying 650 the ultrasonic bandpass filter to the third recording to obtain a third filtered signal; applying 650 the ultrasonic bandpass filter to the fourth recording to obtain a fourth filtered signal; and determining 660 the classification of the gesture based on the third filtered signal and the fourth filtered signal. For example, determining 660 the classification of the gesture can include inputting data based on the third filtered signal and the fourth filtered signal to a machine learning module (e.g., the machine learning module 270) to obtain the classification of the gesture.

Figure 7:
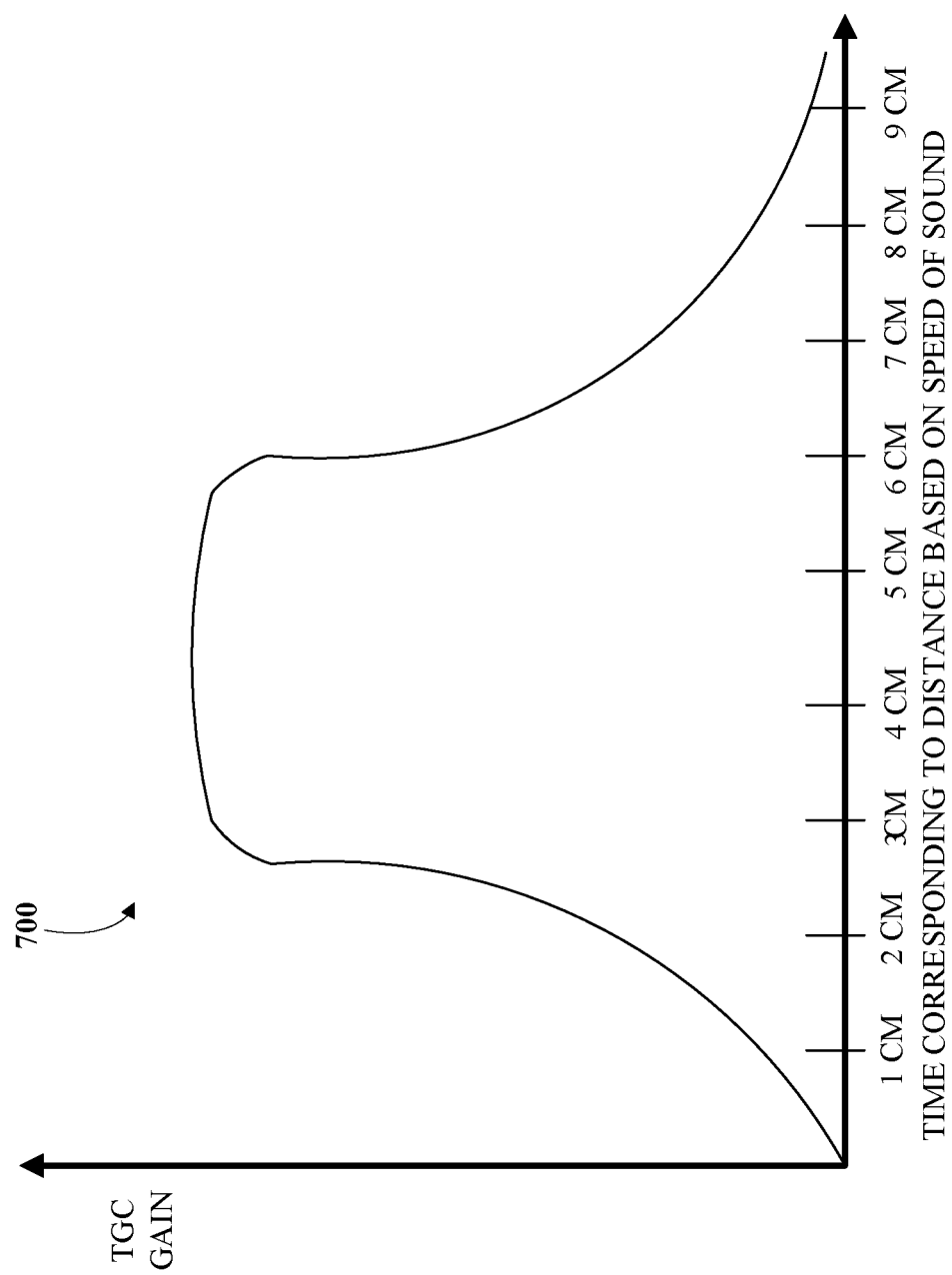
FIG. 7 is a plot of an example of gain curve for a time-gain-compensation processing to facilitate gesture detection at a desired range.

FIG. 7 is a plot of an example of gain curve 700 for a time-gain-compensation processing to facilitate gesture detection at a desired range. The plot shows gain values at various time offsets within a frame of audio samples. The y axis is TGC gain value and the x axis shows time offsets within the frame that are marked by respective corresponding distances that an ultrasonic pulse (e.g., an ultrasonic click) is expected reflect from in order to arrive at the microphone at the time offset. In this example, the gain curve 700 has peak at time offsets corresponding to distances between 3 cm and 6 cm from the device used to play and capture the ultrasonic pulse. Thus, applying time-gain-compensation using the gain curve 700 to a frame of audio data including the ultrasonic pulse could enhance gesture detection for gestures performed at this range of distances from the device.

Figure 9:
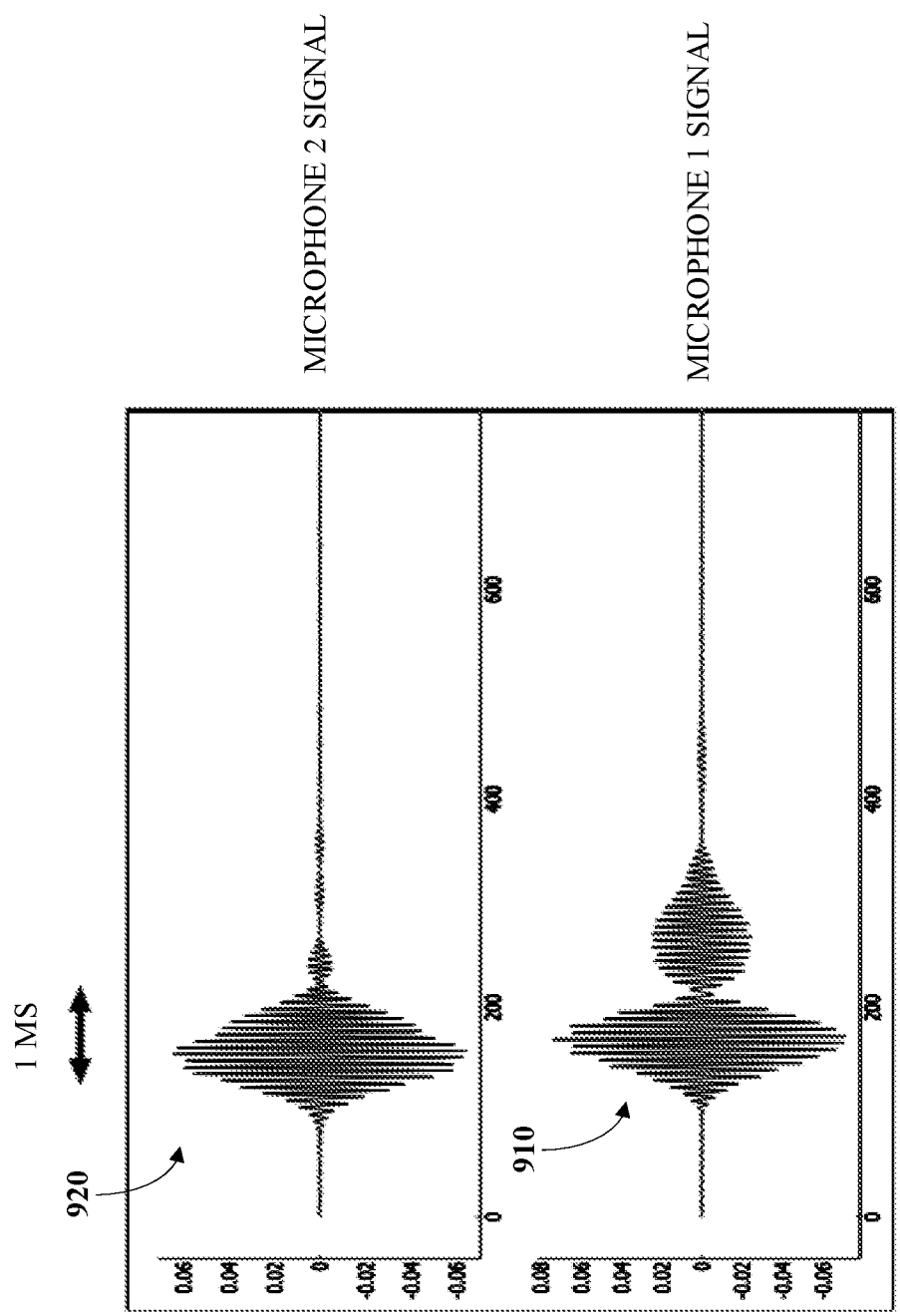
FIG. 9 is a plot of an examples of recordings of an ultrasonic click in the presence of a palm gesture.

FIGS. 8 and 9 show plots of actual waveforms captured by a wearable device (e.g., the wearable device 100) displaying changes in nearfield waveform data for different situations that can be used as input to a machine learning (e.g., neural network) based pattern recognition system for gesture detection.

FIG. 8 is a plot of an examples of recordings of an ultrasonic click with no gesture. The bottom plot 810 shows a first recording of an ultrasonic pulse that has been captured with a first microphone (e.g., the microphone 120). The top plot 820 shows a second recording of the ultrasonic pulse that has been captured with a second microphone (e.g., the microphone 122). The ultrasonic pulse was played and captured while a user was wearing the wearable device 100 without making any gestures near the wearable device 100. The 1 ms time-scale shown is approximate.

FIG. 9 is a plot of an examples of recordings of an ultrasonic click in the presence of a palm gesture. The bottom plot 910 shows a first recording of an ultrasonic pulse that has been captured with a first microphone (e.g., the microphone 120). The top plot 920 shows a second recording of the ultrasonic pulse that has been captured with a second microphone (e.g., the microphone 122). The ultrasonic pulse was played and captured while a user was wearing the wearable device 100 and making a "palm" gesture (e.g., as illustrated in FIG. 10A) near it by bringing the palm of the hand about 5 cm away from the wearable device 100. The 1 ms time-scale shown is approximate. The envelope of the signal in plot 810 is substantially different from the envelope of the signal in plot 910, which could enable a user interface to detect the gesture based on analysis (e.g., using the machine learning module 270) of the first recording in plot 910.

FIG. 10A is an illustration of an example of a palm gesture 1000 being made near the wearable device 100 of FIG. 1A worn on an ear of a human. For example, the process 400 of FIG. 4 or the process 600 of FIG. 6 could be implemented by the wearable device 100 to detect the palm gesture 1000 when it is performed.

Figure 10B:
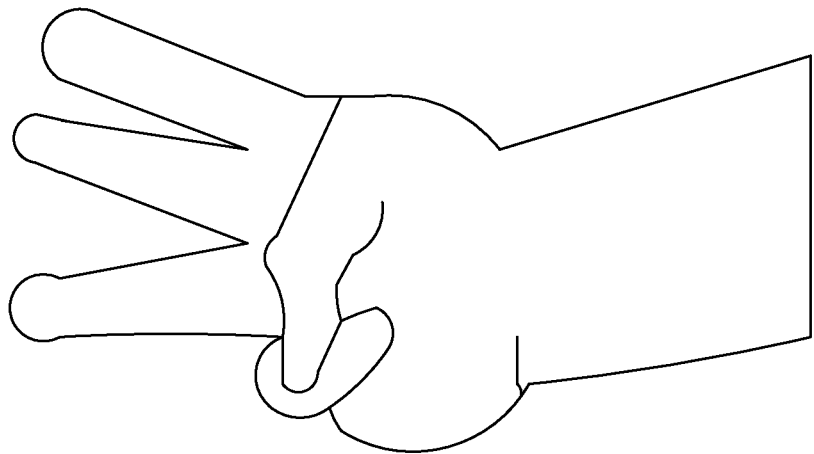
FIG. 10B is an illustration of an example of a three-finger gesture being made with a hand of a human.
Figure 10A:
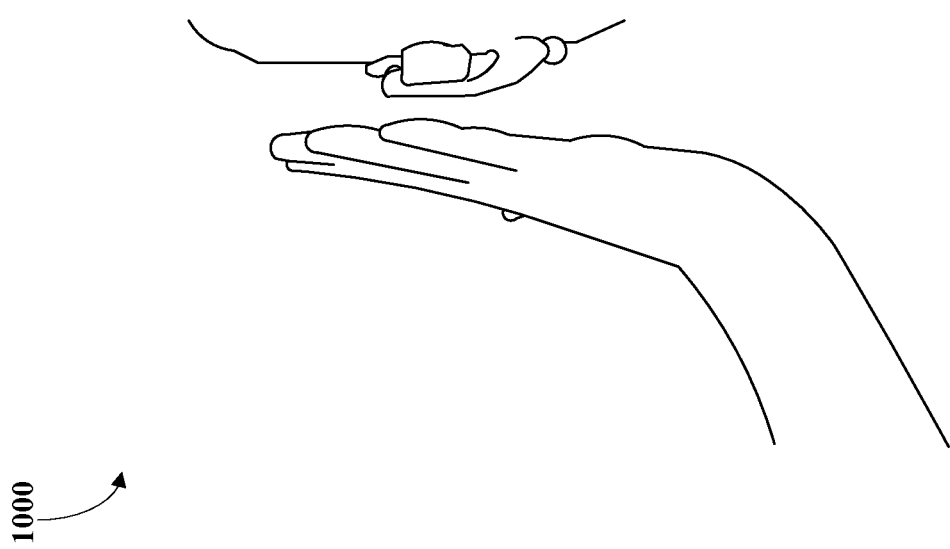
FIG. 10A is an illustration of an example of a palm gesture being made near the device of FIG. 1A worn on an ear of a human.

FIG. 10B is an illustration of an example of a three-finger gesture 1050 being made with a hand of a human. For example, the three-finger gesture 1050 could be made near the wearable device 100 of FIG. 1A worn on an ear of a human. For example, the process 400 of FIG. 4 or the process 600 of FIG. 6 could be implemented by the wearable device 100 to detect the three-finger gesture 1050 when it is performed. Other examples of gestures that could detected using systems and methods described herein could include a one-finger gesture, a two-finger gesture, a thumbs-up gesture, a thumbs-down gesture, a thumb-sideways gesture, and an OK gesture. In some implementations, a system could be configured to detect some American Sign Language (ASL) gestures performed near the wearable device 100.

In a first implementation, a system comprises: a microphone; an audio driver; and a processing apparatus configured to: play an ultrasonic click using the audio driver, wherein the ultrasonic click is a modulated audio pulse with a duration less than one hundred periods of a modulation frequency waveform of the ultrasonic click; access a recording, captured using the microphone, of the ultrasonic click; apply an ultrasonic bandpass filter to the recording to obtain a filtered signal; and determine a classification of a gesture based on the filtered signal.

In the first implementation, the processing apparatus could be configured to: input data based on the filtered signal to a machine learning module to obtain the classification of the gesture. In the first implementation, the microphone could be a first microphone, the recording could be a first recording, and the filtered signal could be a first filtered signal; and the system could further comprise: a second microphone, wherein the processing apparatus is configured to: access a second recording, captured using the second microphone, of the ultrasonic click; apply the ultrasonic bandpass filter to the second recording to obtain a second filtered signal; and determine the classification of the gesture based on the second filtered signal. In the first implementation, the ultrasonic click could be a first ultrasonic click, the recording could be a first recording, and the filtered signal could be a first filtered signal; and the processing apparatus could be configured to: play a second ultrasonic click using the audio driver, wherein the second ultrasonic click has an amplitude different from a corresponding amplitude of the first ultrasonic click; access a second recording, captured using the microphone, of the second ultrasonic click; apply the ultrasonic bandpass filter to the second recording to obtain a second filtered signal; and determine the classification of the gesture based on the second filtered signal. In the first implementation, one of the amplitudes of the first ultrasonic click and the second ultrasonic click could be between twenty-five and seventy-five percent of the other amplitude of the pair. In the first implementation, the amplitude of the second ultrasonic click could be half of the amplitude of the first ultrasonic click. In the first implementation, the system could further comprise: a fastening implement, attached to the audio driver and the microphone, configured to fasten the audio driver and the microphone to a part of a body of a user when the fastening implement is worn by the user. In the first implementation, the part of the body is an ear and the fastening implement includes a curved arm shaped to fit around a back of the ear, between the ear and a skull of the user. In the first implementation, the processing apparatus could be configured to: subtract a background signal from the filtered signal to obtain a residual signal, wherein the classification of the gesture is determined based on the residual signal. In the first implementation, the processing apparatus could be configured to: determine the background signal based on bandpass filtered recordings of ultrasonic clicks, played using the audio driver and captured using the microphone during a calibration period at a start of a gesturing session. In the first implementation, the processing apparatus could be configured to: determine a Doppler shift of the filtered signal, wherein the classification of the gesture is determined based on the Doppler shift. In the first implementation, the processing apparatus could be configured to: determine an envelope of the filtered signal, wherein the classification of the gesture is determined based on the envelope. In the first implementation, the processing apparatus could be configured to: determine an amplitude and a phase of the filtered signal, wherein the classification of the gesture is determined based on the amplitude and the phase. In the first implementation, the processing apparatus could be configured to: apply time-gain-compensation to the filtered signal. In the first implementation, the time-gain-compensation could have a peak corresponding to a range of distances from the microphone between three centimeters and six centimeters. In the first implementation, the modulation frequency waveform could be at a frequency between 18 kilohertz and 25 kilohertz. In the first implementation, the ultrasonic click is windowed by a Gaussian shaping function.

In a second implementation, a method comprises: playing an ultrasonic click using an audio driver, wherein the ultrasonic click is a modulated audio pulse with a duration less than one hundred periods of a modulation frequency waveform of the ultrasonic click; accessing a recording, captured using a microphone, of the ultrasonic click; applying an ultrasonic bandpass filter to the recording to obtain a filtered signal; determining a classification of a gesture based on the filtered signal; and transmitting, storing, or displaying an indication of the classification of the gesture.

In the second implementation, determining the classification of the gesture based on the filtered signal could comprise: inputting data based on the filtered signal to a machine learning module to obtain the classification of the gesture. In the second implementation, the microphone could be a first microphone, the recording could be a first recording, and the filtered signal could be a first filtered signal; and the method could further comprise: accessing a second recording, captured using a second microphone, of the ultrasonic click; applying the ultrasonic bandpass filter to the second recording to obtain a second filtered signal; and determining the classification of the gesture based on the second filtered signal. In the second implementation, the ultrasonic click could be a first ultrasonic click, the recording nay be a first recording, and the filtered signal could be a first filtered signal; and the method could further comprise: playing a second ultrasonic click using the audio driver, wherein the second ultrasonic click has an amplitude different from a corresponding amplitude of the first ultrasonic click; accessing a second recording, captured using the microphone, of the second ultrasonic click; applying the ultrasonic bandpass filter to the second recording to obtain a second filtered signal; and determining the classification of the gesture based on the second filtered signal. In the second implementation, one of the amplitudes of the first ultrasonic click and the second ultrasonic click is between twenty-five and seventy-five percent of the other amplitude of the pair. In the second implementation, the amplitude of the second ultrasonic click is half of the amplitude of the first ultrasonic click. In the second implementation, the method could comprise subtracting a background signal from the filtered signal to obtain a residual signal, wherein the classification of the gesture is determined based on the residual signal. In the second implementation, the method could comprise: determining the background signal based on bandpass filtered recordings of ultrasonic clicks, played using the audio driver and captured using the microphone during a calibration period at a start of a gesturing session. In the second implementation, the method could comprise: determining a Doppler shift of the filtered signal, wherein the classification of the gesture is determined based on the Doppler shift. In the second implementation, the method could comprise: determining an envelope of the filtered signal, wherein the classification of the gesture is determined based on the envelope. In the second implementation, the method could comprise: determining an amplitude and a phase of the filtered signal, wherein the classification of the gesture is determined based on the amplitude and the phase. In the second implementation, the method could comprise: applying time-gain-compensation to the filtered signal. In the second implementation, the time-gain-compensation could have a peak corresponding to a range of distances from the microphone between three centimeters and six centimeters. In the second implementation, the modulation frequency waveform could be at a frequency between 18 kilohertz and 25 kilohertz. In the second implementation, ultrasonic click is windowed by a Gaussian shaping function.

In a third implementation, a system comprises: a microphone; an audio driver; and a processing apparatus configured to: play a first ultrasonic pulse using the audio driver; play a second ultrasonic pulse using the audio driver, wherein the second ultrasonic pulse has an amplitude different from a corresponding amplitude of the first ultrasonic pulse; access a first recording, captured using the microphone, of the first ultrasonic pulse; access a second recording, captured using the microphone, of the second ultrasonic pulse; apply an ultrasonic bandpass filter to the first recording to obtain a first filtered signal; apply the ultrasonic bandpass filter to the second recording to obtain a second filtered signal; and determine a classification of a gesture based on the first filtered signal and the second filtered signal.

In the third implementation, the processing apparatus could be configured to: input data based on the first filtered signal and the second filtered signal to a machine learning module to obtain the classification of the gesture. In the third implementation, the microphone could be a first microphone, and the system could further comprise: a second microphone, wherein the processing apparatus is configured to: access a third recording, captured using the second microphone, of the first ultrasonic pulse; access a fourth recording, captured using the second microphone, of the second ultrasonic pulse; apply the ultrasonic bandpass filter to the third recording to obtain a third filtered signal; apply the ultrasonic bandpass filter to the fourth recording to obtain a fourth filtered signal; and determine the classification of the gesture based on the third filtered signal and the fourth filtered signal. In the third implementation, one of the amplitudes of the first ultrasonic pulse and the second ultrasonic pulse could be between twenty-five and seventy-five percent of the other amplitude of the pair. In the third implementation, the amplitude of the second ultrasonic pulse could be half of the amplitude of the first ultrasonic pulse. In the third implementation, the system could comprise: a fastening implement, attached to the audio driver and the microphone, configured to fasten the audio driver and the microphone to a part of a body of a user when the fastening implement is worn by the user. In the third implementation, the part of the body could be an ear and the fastening implement could include a curved arm shaped to fit around a back of the ear, between the ear and a skull of the user. In the third implementation, the processing apparatus could be configured to: subtract a background signal from the first filtered signal to obtain a residual signal, wherein the classification of the gesture is determined based on the residual signal. In the third implementation, the processing apparatus could be configured to: determine the background signal based on bandpass filtered recordings of ultrasonic clicks, played using the audio driver and captured using the microphone during a calibration period at a start of a gesturing session. In the third implementation, the processing apparatus could be configured to: determine a Doppler shift of the first filtered signal, wherein the classification of the gesture is determined based on the Doppler shift. In the third implementation, the processing apparatus could be configured to: determine an envelope of the first filtered signal, wherein the classification of the gesture is determined based on the envelope. In the third implementation, the processing apparatus is configured to: determine an amplitude and a phase of the first filtered signal, wherein the classification of the gesture is determined based on the amplitude and the phase. In the third implementation, the processing apparatus could be configured to: apply time-gain-compensation to the first filtered signal and the second filtered signal. In the third implementation, the time-gain-compensation could have a peak corresponding to a range of distances from the microphone between three centimeters and six centimeters. In the third implementation, the first ultrasonic pulse and the second ultrasonic pulse could be modulated with a modulation frequency waveform that is at a frequency between 18 kilohertz and 25 kilohertz. In the third implementation, the first ultrasonic pulse could be windowed by a Gaussian shaping function.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. A system comprising:
a microphone;
an audio driver; and
a processing apparatus configured to:
  play an ultrasonic click using the audio driver, wherein the ultrasonic click is a modulated audio pulse with a duration less than one hundred periods of a modulation frequency waveform of the ultrasonic click;
  access a recording, captured using the microphone, of the ultrasonic click;
  apply an ultrasonic bandpass filter to the recording to obtain a filtered signal; and
  determine a classification of a gesture based on the filtered signal.

2. The system of claim 1, wherein the processing apparatus is further configured to:
input data based on the filtered signal to a machine learning module to obtain the classification of the gesture.

3. The system of claim 1, wherein the microphone is a first microphone, the recording is a first recording, and the filtered signal is a first filtered signal; and further comprising:
a second microphone, wherein the processing apparatus is configured to:
  access a second recording, captured using the second microphone, of the ultrasonic click;
  apply the ultrasonic bandpass filter to the second recording to obtain a second filtered signal; and
  determine the classification of the gesture based on the second filtered signal.

4. The system of claim 1, wherein the ultrasonic click is a first ultrasonic click, the recording is a first recording, and the filtered signal is a first filtered signal; and the processing apparatus is further configured to:
play a second ultrasonic click using the audio driver, wherein the second ultrasonic click has an amplitude different from a corresponding amplitude of the first ultrasonic click;
access a second recording, captured using the microphone, of the second ultrasonic click;
apply the ultrasonic bandpass filter to the second recording to obtain a second filtered signal; and
determine the classification of the gesture based on the second filtered signal.

5. The system of claim 1, further comprising:
a fastening implement, attached to the audio driver and the microphone, configured to fasten the audio driver and the microphone to a part of a body of a user when the fastening implement is worn by the user.

6. The system of claim 5, wherein the part of the body is an ear and the fastening implement includes a curved arm shaped to fit around a back of the ear, between the ear and a skull of the user.

7. The system of claim 1, wherein the processing apparatus is further configured to:

subtract a background signal from the filtered signal to obtain a residual signal, wherein the classification of the gesture is determined based on the residual signal.

8. The system of claim 1, wherein the processing apparatus is further configured to:
determine a Doppler shift of the filtered signal, wherein the classification of the gesture is determined based on the Doppler shift.

9. The system of claim 1, wherein the processing apparatus is further configured to:
determine an envelope of the filtered signal, wherein the classification of the gesture is determined based on the envelope.

10. The system of claim 1, wherein the processing apparatus is further configured to:
determine an amplitude and a phase of the filtered signal, wherein the classification of the gesture is determined based on the amplitude and the phase.

11. The system of claim 1, wherein the processing apparatus is further configured to:
apply time-gain-compensation to the filtered signal.

12. The system of claim 1, wherein the modulation frequency waveform is at a frequency between 18 kilohertz and 25 kilohertz.

13. A method comprising:
playing an ultrasonic click using an audio driver, wherein the ultrasonic click is a modulated audio pulse with a duration less than one hundred periods of a modulation frequency waveform of the ultrasonic click;
accessing a recording, captured using a microphone, of the ultrasonic click;
applying an ultrasonic bandpass filter to the recording to obtain a filtered signal;
determining a classification of a gesture based on the filtered signal; and
transmitting, storing, or displaying an indication of the classification of the gesture.

14. The method of claim 13, wherein determining the classification of the gesture based on the filtered signal comprises:
inputting data based on the filtered signal to a machine learning module to obtain the classification of the gesture.

15. The method of claim 13, wherein the microphone is a first microphone, the recording is a first recording, and the filtered signal is a first filtered signal; and further comprising:
accessing a second recording, captured using a second microphone, of the ultrasonic click;
applying the ultrasonic bandpass filter to the second recording to obtain a second filtered signal; and
determining the classification of the gesture based on the second filtered signal.

16. The method of claim 13, wherein the ultrasonic click is a first ultrasonic click, the recording is a first recording, and the filtered signal is a first filtered signal; and further comprising:
playing a second ultrasonic click using the audio driver, wherein the second ultrasonic click has an amplitude different from a corresponding amplitude of the first ultrasonic click;
accessing a second recording, captured using the microphone, of the second ultrasonic click;
applying the ultrasonic bandpass filter to the second recording to obtain a second filtered signal; and
determining the classification of the gesture based on the second filtered signal.

17. The method of claim 13, further comprising:
subtracting a background signal from the filtered signal to obtain a residual signal, wherein the classification of the gesture is determined based on the residual signal.

18. The method of claim 13, further comprising:
determining a Doppler shift of the filtered signal, wherein the classification of the gesture is determined based on the Doppler shift.

19. The method of claim 13, further comprising:
determining an envelope of the filtered signal, wherein the classification of the gesture is determined based on the envelope.

20. The method of claim 13, further comprising:
determining an amplitude and a phase of the filtered signal, wherein the classification of the gesture is determined based on the amplitude and the phase.

21. The method of claim 13, further comprising:
applying time-gain-compensation to the filtered signal.

22. The system of claim 1, wherein the modulated audio pulse is shaped according to a shaping function that sets the duration based on an envelope of the modulation frequency waveform.

23. The system of claim 1, wherein the classification is determined without any time-of-flight measurement associated with the recording or the filtered signal.

24. The method of claim 13, wherein the modulated audio pulse is shaped according to a shaping function that sets the duration based on an envelope of the modulation frequency waveform.

25. The method of claim 13, wherein the classification is determined without any time-of-flight measurement associated with the recording or the filtered signal.

* * * * *